United States Patent
Watola et al.

(10) Patent No.: US 10,872,472 B2
(45) Date of Patent: Dec. 22, 2020

(54) SYSTEMS FOR AUGMENTED REALITY VISUAL AIDS AND TOOLS

(71) Applicant: EYEDAPTIC, INC., Laguna Niguel, CA (US)

(72) Inventors: David Watola, Irvine, CA (US); Jay E. Cormier, Laguna Niguel, CA (US); Brian Kim, San Clemente, CA (US)

(73) Assignee: EYEDAPTIC, INC., Laguna Niguel, CA (US)

( * ) Notice: Subject to any disclaimer, the term of this patent is extended or adjusted under 35 U.S.C. 154(b) by 0 days.

(21) Appl. No.: 16/789,237

(22) Filed: Feb. 12, 2020

(65) Prior Publication Data

US 2020/0184730 A1    Jun. 11, 2020

Related U.S. Application Data

(63) Continuation of application No. 15/817,117, filed on Nov. 17, 2017, now abandoned.
(Continued)

(51) Int. Cl.
 *G06T 19/00* (2011.01)
 *G09B 21/00* (2006.01)
 (Continued)

(52) U.S. Cl.
 CPC ........ *G06T 19/006* (2013.01); *G02B 27/0172* (2013.01); *G06F 3/011* (2013.01);
 (Continued)

(58) Field of Classification Search
 CPC ..... G06T 19/006; G06T 5/002; G09B 21/008; G09B 21/009; G06F 3/013; G06F 3/011;
 (Continued)

(56) References Cited

U.S. PATENT DOCUMENTS

| | | | |
|---|---|---|---|
| 5,777,715 A | 7/1998 | Kruegle et al. | |
| 5,892,570 A * | 4/1999 | Stevens | A61B 3/024 351/222 |

(Continued)

FOREIGN PATENT DOCUMENTS

| | | |
|---|---|---|
| CA | 2916780 A1 | 10/2008 |
| CA | 164180 S | 9/2016 |

(Continued)

OTHER PUBLICATIONS

Anabel Martin González, Advanced Imaging in Head-Mounted Displays for Patients with Age-Related Macular Degeneration Dissertation, 2011, Doctoral dissertation, Technische Universitht München (Technical University of Munich), pp. 1-129. (Year: 2011).*

(Continued)

*Primary Examiner* — Jeffery A Brier
(74) *Attorney, Agent, or Firm* — Shay Glenn LLP

(57) ABSTRACT

Adaptive Control Driven System/ACDS 99, supports visual enhancement, mitigation of challenges and with basic image modification algorithms and any known hardware from contact lenses to IOLs to AR hardware glasses, & enables users to enhance vision with user interface based on a series of adjustments that are applied to move, modify, or reshape image sets and components with full advantage of the remaining useful retinal area, thus addressing aspects of visual challenges heretofore inaccessible by devices which learn needed adjustments.

20 Claims, 15 Drawing Sheets

Related U.S. Application Data

(60) Provisional application No. 62/424,343, filed on Nov. 18, 2016, provisional application No. 62/579,798, filed on Oct. 31, 2017.

(51) Int. Cl.
| | | |
|---|---|---|
| *G06F 3/01* | (2006.01) | |
| *G06T 5/00* | (2006.01) | |
| *G02B 27/01* | (2006.01) | |
| *G06F 3/16* | (2006.01) | |

(52) U.S. Cl.
CPC .............. *G06F 3/012* (2013.01); *G06F 3/013* (2013.01); *G06T 5/002* (2013.01); *G09B 21/008* (2013.01); *G09B 21/009* (2013.01); *G02B 2027/011* (2013.01); *G02B 2027/014* (2013.01); *G02B 2027/0134* (2013.01); *G02B 2027/0138* (2013.01); *G02B 2027/0141* (2013.01); *G02B 2027/0178* (2013.01); *G06F 3/167* (2013.01)

(58) Field of Classification Search
CPC .............. G06F 3/012; G02B 2027/014; G02B 2027/0141; G02B 27/0172; G02B 2027/011; G02B 2027/0178; G02B 2027/0138; G02B 2027/0134; A61B 3/032

See application file for complete search history.

(56) References Cited

U.S. PATENT DOCUMENTS

| | | | |
|---|---|---|---|
| 8,384,999 | B1 | 2/2013 | Crosby et al. |
| 8,976,086 | B2 | 3/2015 | Hilkes |
| 9,516,283 | B2 | 12/2016 | Hilkes et al. |
| 9,782,084 | B2 | 10/2017 | Maertz |
| 10,429,675 | B2 | 10/2019 | Greget |
| 10,564,714 | B2 | 2/2020 | Marggraff et al. |
| 2007/0200927 | A1 | 8/2007 | Krenik |
| 2008/0013047 | A1 | 1/2008 | Todd et al. |
| 2008/0247620 | A1 | 10/2008 | Lewis et al. |
| 2008/0309878 | A1* | 12/2008 | Hirji ............... A61B 3/032 351/223 |
| 2011/0043644 | A1 | 2/2011 | Munger et al. |
| 2011/0109876 | A1 | 5/2011 | Reichow et al. |
| 2011/0181692 | A1* | 7/2011 | Kuno ............... H04N 13/183 348/43 |
| 2011/0285960 | A1* | 11/2011 | Kohn ............... A61B 3/032 351/159.74 |
| 2012/0206452 | A1 | 8/2012 | Geisner et al. |
| 2012/0242865 | A1 | 9/2012 | Vartanian et al. |
| 2012/0309529 | A1 | 12/2012 | Westlund et al. |
| 2013/0215147 | A1 | 8/2013 | Hilkes et al. |
| 2014/0063062 | A1 | 3/2014 | Fateh |
| 2014/0210970 | A1 | 7/2014 | Dalal et al. |
| 2015/0002808 | A1 | 1/2015 | Rizzo, III et al. |
| 2015/0355481 | A1 | 12/2015 | Hilkes et al. |
| 2016/0033771 | A1 | 2/2016 | Tremblay et al. |
| 2016/0085302 | A1 | 3/2016 | Publicover et al. |
| 2016/0116979 | A1 | 4/2016 | Border |
| 2016/0156850 | A1 | 6/2016 | Werblin et al. |
| 2016/0171779 | A1 | 6/2016 | Bar-Zeev et al. |
| 2016/0187969 | A1 | 6/2016 | Larsen et al. |
| 2016/0216515 | A1 | 7/2016 | Bouchier et al. |
| 2016/0235291 | A1* | 8/2016 | Goh ............... A61B 3/0091 |
| 2016/0264051 | A1 | 9/2016 | Werblin |
| 2016/0270648 | A1 | 9/2016 | Freeman et al. |
| 2016/0270656 | A1 | 9/2016 | Samec et al. |
| 2016/0314564 | A1 | 10/2016 | Jones et al. |
| 2016/0349509 | A1 | 12/2016 | Lanier et al. |
| 2017/0185723 | A1 | 6/2017 | McCallum et al. |
| 2017/0200296 | A1 | 7/2017 | Jones et al. |
| 2017/0221264 | A1 | 8/2017 | Perry |
| 2017/0249862 | A1 | 8/2017 | Border |
| 2017/0273552 | A1 | 9/2017 | Leung et al. |
| 2018/0104106 | A1 | 4/2018 | Lee et al. |
| 2018/0144554 | A1 | 5/2018 | Watola et al. |
| 2018/0249151 | A1 | 8/2018 | Freeman et al. |
| 2018/0365877 | A1 | 12/2018 | Watola et al. |
| 2019/0012841 | A1 | 1/2019 | Kim et al. |
| 2019/0180421 | A1 | 6/2019 | Kim et al. |
| 2019/0281211 | A1 | 9/2019 | Watola et al. |
| 2019/0331920 | A1 | 10/2019 | Watola et al. |
| 2019/0339528 | A1 | 11/2019 | Freeman et al. |
| 2019/0385342 | A1 | 12/2019 | Freeman et al. |

FOREIGN PATENT DOCUMENTS

| | | | |
|---|---|---|---|
| EP | 2674805 A2 | 12/2013 | |
| WO | WO2008/119187 A1 | 10/2005 | |
| WO | WO2011/060525 A1 | 5/2011 | |
| WO | WO2013/120180 A1 | 8/2013 | |
| WO | WO2013/177654 A1 | 12/2013 | |
| WO | WO2014/107261 A1 | 7/2014 | |
| WO | WO-2016036860 A1 * | 3/2016 | .............. G06T 3/20 |
| WO | WO2016/077343 A1 | 5/2016 | |
| WO | WO2016/144419 A1 | 9/2016 | |
| WO | WO2016/149536 A1 | 9/2016 | |
| WO | WO2016/168913 A1 | 10/2016 | |
| WO | WO2017/059522 A1 | 4/2017 | |
| WO | WO2018/200717 A1 | 11/2018 | |
| WO | WO2020/014705 A1 | 1/2020 | |
| WO | WO2020/014707 A1 | 1/2020 | |

OTHER PUBLICATIONS

Carroll et al.; Visual field testing:from one medical student to another; 18 pages; retrieved from the internet (http://eyerounds.org/tutorials/VF-testing/); Aug. 22, 2013.

Unser et al.; B-spline signal processing: Part II—efficient design and applicationtions; IEEE Transactions on Signal Processing; 41(2); pp. 834-848; Feb. 1993.

Unser et al.; B-spline signal processing; part I—theory; IEEE Transactions on Signal Processing; 41(2)); pp. 821-832; Feb. 1993.

Unser et al.; TheL2 polynomial spline pyramid; IEEE Transactions on Pattern Analysis and Machine Intelligence; 15(4); pp. 364-379; Apr. 1993.

Unser; Splines—a perfect fit for signal and image processing; IEEE Signal Processing Magazine; 16 (Article); pp. 22-38; Nov. 1999.

Kim et al.; U.S. Appl. No. 16/727,564 entitled "Artificial intelligence enhanced system for adaptive control driven ar/vr visual aids," filed Dec. 26, 2019.

\* cited by examiner

SYSTEMS FOR AUGMENTED REALITY VISUAL AIDS AND TOOLS

CROSS REFERENCE TO RELATED APPLICATIONS

Expressly incorporated by reference, this application is a continuation of U.S. patent application Ser. No. 15/817,117, filed Nov. 17, 2017, which application claims priority to U.S. Provisional Application No. 62/424,343, filed Nov. 18, 2016, and to U.S. Provisional Application No. 62/579,798, filed Oct. 31, 2017.

FIELD

The fields of vision augmentation, automation of the same, specialized interfaces between users and such tools, including but not limited to artificial intelligence—particularly for visually challenged users of certain types, were a launch point for the instant systems now encompassing improved systems for augmented reality visual aids and tools.

BACKGROUND OF THE DISCLOSURE

A modicum of background stitches together the various aspects of what the instant inventions offer to several divergent attempts to merge optical, visual and cognitive elements in systems to create, correct and project images for users.

Augmented Reality (AR) eyewear implementations fall cleanly into two disjoint categories, video see-through (VST) and optical see-through (OST). Apparatus for VST AR closely resembles Virtual Reality (VR) gear, where the wearer's eyes are fully enclosed so that only content directly shown on the embedded display remains visible. VR systems maintain a fully-synthetic three-dimensional environment that must be continuously updated and rendered at tremendous computational cost. In contrast, VST AR instead presents imagery based on the real-time video feed from an appropriately-mounted camera (or cameras) directed along the user's eyeline; hence the data and problem domain are fundamentally two-dimensional. VST AR provides absolute control over the final appearance of visual stimulus, and facilitates registration and synchronization of captured video with any synthetic augmentations. Very wide fields-of-view (FOV) approximating natural human limits are also achievable at low cost.

OST AR eyewear has a direct optical path allowing light from the scene to form a natural image on the retina. This natural image is essentially the same one that would be formed without AR glasses. A camera is used to capture the scene for automated analysis, but its image does not need to be shown to the user. Instead, computed annotations or drawings from an internal display are superimposed onto the natural retinal image by (e.g.) direct laser projection or a half-silvered mirror for optical combining.

The primary task of visual-assistance eyewear for low-vision sufferers does not match the most common use model for AR (whether VST or OST), which involves superimposing annotations or drawings on a background image that is otherwise faithful to the reality seen by the unaided eye. Instead, assistive devices need to dramatically change how the environment is displayed in order to compensate defects in the user's vision. Processing may include contrast enhancement and color mapping, but invariably incorporates increased magnification to counteract deficient visual acuity. Existing devices for low-vision are magnification-centric, and hence operate in the VST regime with VST hardware.

Tailoring the central visual field to suit the user and current task leverages a hallmark capability of the VST paradigm—absolute control over the finest details of the retinal image—to provide flexible customization and utility where it is most needed. Even though the underlying platform is fundamentally OST, careful blending restores a naturally wide field-of-view for a seamless user experience despite the narrow active display region.

There exists a longstanding need to merge the goals of visual-assistance eyewear for low-vision sufferers with select benefits of the AR world and models emerging from the same—which did not exist, it is respectfully proposed, in advance of the instant teachings thus making them eligible for Letters Patent under the Paris Convention and National and International Laws.

OBJECTS AND SUMMARY OF THE INVENTION

The FOV model from AR in light of the needs of visually challenged users then becomes a template used for changes needed for re-mapping and in many cases the required warping of subject images, as known to those of skill in the art. Like the adjustments used to create the model, modifications to parameters that control warping are also interactively adjusted by the user. In addition to direct user control of the image modification coupled with instantaneous visual feedback, the software imposes a structured process guiding the user to address large-scale appearance before fine-tuning small details. This combination allows the user to tailor the algorithm precisely to his or her affected vision for optimal visual enhancement.

For people with retinal diseases, adapting to loss a vision becomes a way of life. This impact can affect their life in many ways including loss of the ability to read, loss of income, loss of mobility and an overall degraded quality of life. However, with prevalent retinal diseases such as AMD (Age related Macular Degeneration) not all of the vision is lost, and in this case the peripheral vision remains intact as only the central vision is impacted with the degradation of the macula. Given that the peripheral vision remains intact it is possible to take advantage of eccentric viewing and through patient adaptation to increase functionality such as reading. Another factor in increasing reading ability with those with reduced vision is the ability to views words in context as opposed to isolation. Magnification is often used as a simply visual aid with some success. However, with increased magnification comes decreased FOV (Field of View) and therefore the lack of ability to see other words or objects around the word or object of interest. The capability to guide the training for eccentric viewing and eye movement and fixation training is important to achieve the improvement in functionality such as reading. These approaches outlined below will serve to both describe novel ways to use augmented reality techniques to both automate and improve the training.

In order to help users with central vision deficiencies many of the instant tools were evolved. It is important to train and help their ability to fixate on a target. Since central vision is normally used for this, this is an important step to help users control their ability to focus on a target, as leg work for more training and adaptation functionality. This fixation training can be accomplished through gamification built into the software algorithms, and is utilized periodically for increased fixation training and improved adaptation. The gamification can be accomplished by following fixation targets around the display screen and in conjunction with a hand held pointer can select or click on the target during timed or untimed exercise. Furthermore, this can be accomplished through voice active controls as a substitute or adjunct to a hand help pointer.

To aid the user in targeting and fixation certain guide lines can be overlaid on reality or on the incoming image to help guide the users eye movements along the optimal path. These guidelines can be a plurality of constructs such as, but not limited to, cross hair targets, bullseye targets or linear guidelines such as singular or parallel dotted lines of a fixed or variable distance apart, a dotted line or solid box of varying colors. This will enable the user to increase their training and adaptation for eye movement control to following the tracking lines or targets as their eyes move across a scene in the case of a landscape, picture or video monitor or across a page in the case of reading text.

To make the most of a user's remaining useful vision methods for adaptive peripheral vision training can be employed. Training and encouraging the user to make the most of their eccentric viewing capabilities is important. As described the user may naturally gravitate to their PRL (preferred retinal locus) to help optimized their eccentric viewing. However, this may not be the optimal location to maximize their ability to view images or text with their peripheral vision. Through use of skewing and warping the images presented to the user, along with the targeting guidelines it can be determined where the optimal place for the user to target their eccentric vision. Eccentric viewing training through reinforced learning can be encouraged by a series of exercises. The targeting as described in fixation training can also be used for this training. With fixation targets on and the object, area, or word of interest can be incrementally tested by shifting locations to determine the best PRL for eccentric viewing.

Also, pupil tracking algorithms can be employed and not only have eye tracking capability but can also utilize user customized offset for improved eccentric viewing capability. Whereby the eccentric viewing targets are offset guide the user to focus on their optimal area for eccentric viewing.

Further improvements in visual adaptation are achieved through use of the hybrid distortion algorithms. With the layered distortion approach objects or words on the outskirts of the image can receive a different distortion and provide a look ahead preview to piece together words for increased reading speed. While the user is focused on the area of interest that is being manipulated the words that are moving into the focus area can help to provide context in order to interpolate and better understand what is coming for faster comprehension and contextual understanding.

BRIEF DESCRIPTION OF THE DRAWINGS

Various preferred embodiments are described herein with references to the drawings in which merely illustrative views are offered for consideration, whereby.

DETAILED DESCRIPTION OF THE INVENTIONS AND EXAMPLES

Figure 1A:
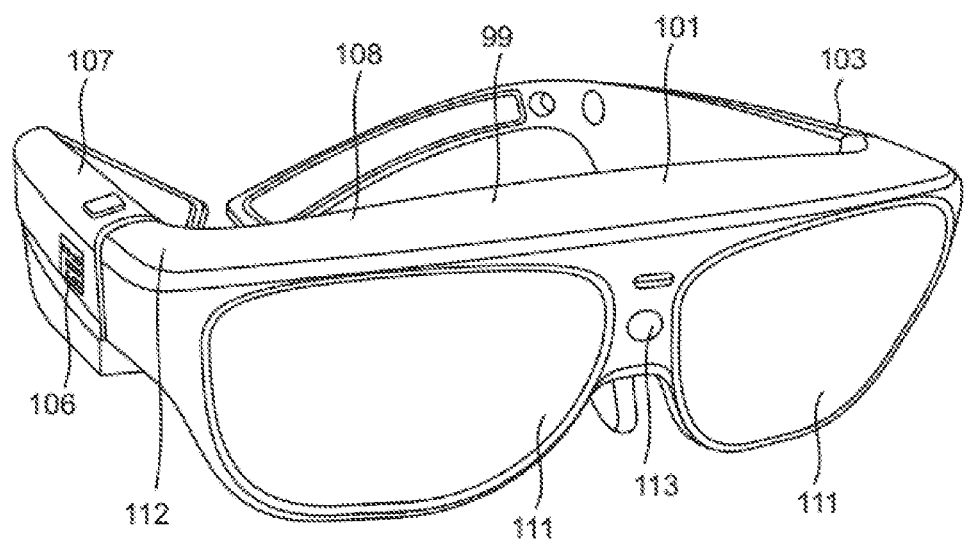
FIG. 1A is a view of schematized example of external framed glasses typical for housing features of the present invention.
Figure 1B:
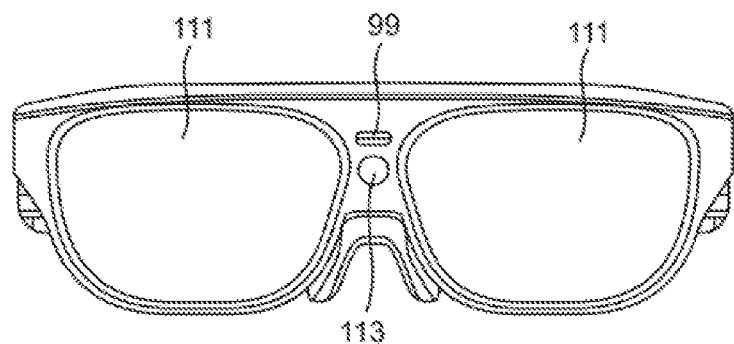
FIG. 1B is a view of example glasses typical for housing features of the present invention.
Figure 1C:
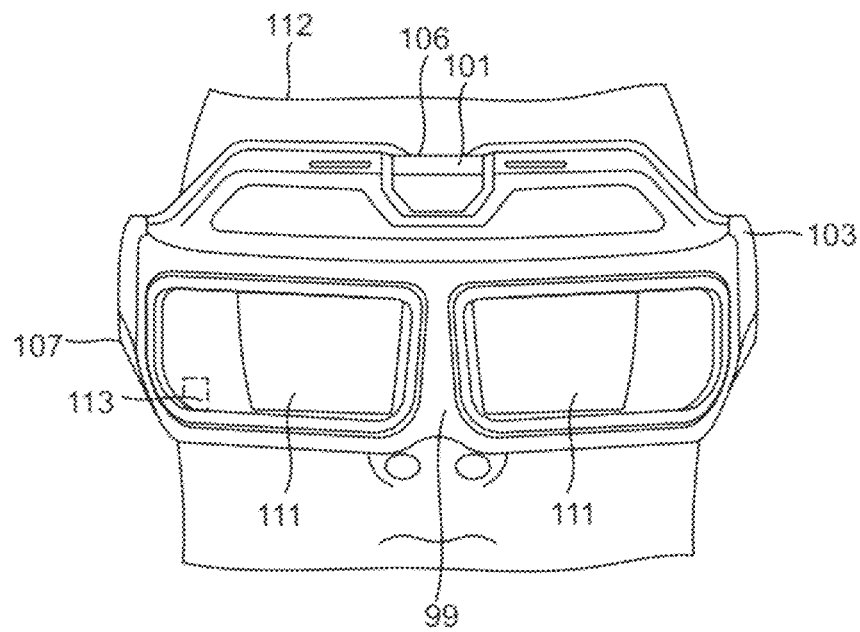
FIG. 1C is a view of example glasses typical for housing features of the present invention.
Figure 1D:
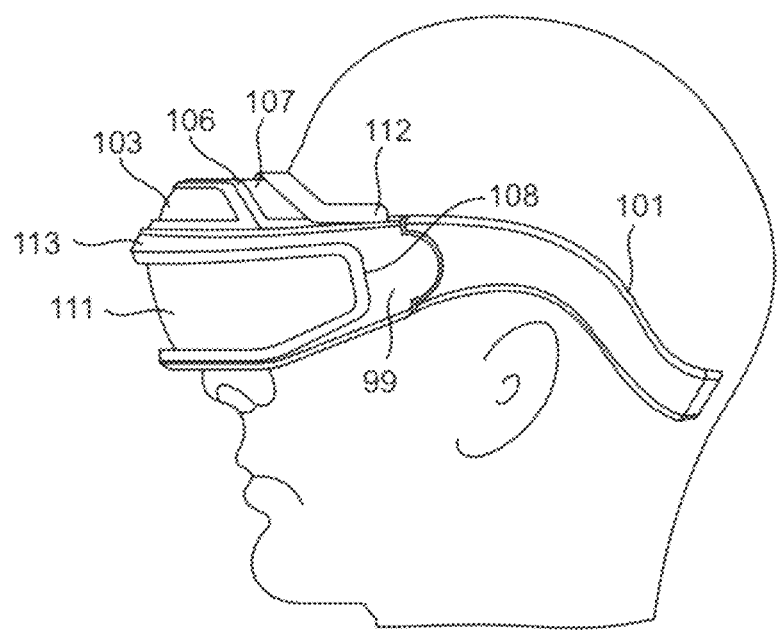
FIG. 1D is a view of example glasses typical for housing features of the present invention

As defined herein "ACDS" comprises those objects of the present inventions embodying the defined characteristic functionality illustrated herein by way of schematic Figures and exemplary descriptions, none of which is intended to be limiting of the scope of the instant teachings. By way of example, any other and further features of the present invention or desiderate offered for consideration hereto may be manifested, as known to artisans, in any known or developed contact lens, Intra Ocular Lens (IOL), thin or thick film having optical properties, GOOGLE® type of glass or the like means for arraying, disposing and housing functional optical and visual enhancement elements.

As referenced, embodiments of the Interactive Augmented Reality (AR) Visual Aid inventions described below were designed and intended for users with visual impairments that impact field of vision (FOV). Usages beyond this scope have evolved in real-time and have been incorporated herein expressly by reference.

By way of example these disease states may take the form of age-related macular degeneration, retinitis pigmentosa, diabetic retinopathy, Stargardt's disease, and other diseases where damage to part of the retina impairs vision. The invention described is novel because it not only supplies algorithms to enhance vision, but also provides simple but powerful controls and a structured process that allows the user to adjust those algorithms.

Referring now to FIG. 1-10 and in particular to FIGS. 1A-1D and 2, exemplary ACDS 99 is housed in a glasses frame model including both features and zones of placement which are interchangeable for processor 101, charging and dataport 103, dual display 111, control buttons 106, accelerometer gyroscope magnetometer 112, Bluetooth/Wi-Fi 108, autofocus camera 113, as known to those skilled in the art. For example, batteries 107, including lithium-ion batteries shown in a figure, or any known or developed other versions, shown in other of said figures are contemplated as either a portion element or supplement/attachment/appendix to the instant teachings the technical feature being functioning as a battery.

In sum, as shown in FIG. 1A-1D, any basic hardware can constructed from a non-invasive, wearable electronics-based AR eyeglass system (see FIG. 1A-1D) employing any of a variety of integrated display technologies, including LCD, OLED, or direct retinal projection. Materials are also able to be substituted for the "glass" having electronic elements embedded within the same, so that "glasses" may be understood to encompass for example, sheets of lens and camera containing materials, IOLs, contact lenses and the like functional units. Likewise, electronic magnifiers may be used such as the Ruby® brand of Electronic Modifier.

A plurality of cameras, mounted on the glasses, continuously monitors the view where the glasses are pointing. The AR system also contains an integrated processor and memory storage (either embedded in the glasses, or tethered by a cable) with embedded software implementing real-time algorithms that modify the images as they are captured by the camera(s). These modified, or corrected, images are then continuously presented to the eyes of the user via the integrated displays.

It is contemplated that the processes described above are implemented in a system configured to present an image to the user. The processes may be implemented in software, such as machine readable code or machine executable code that is stored on a memory and executed by a processor. Input signals or data is received by the unit from a user, cameras, detectors or any other device. Output is presented to the user in any manner, including a screen display or headset display. The processor and memory is part of the headset 99 shown in FIG. 1A-1D or a separate component linked to the same. Electronic magnifiers, as discussed are also able to be used.

Figure 2:
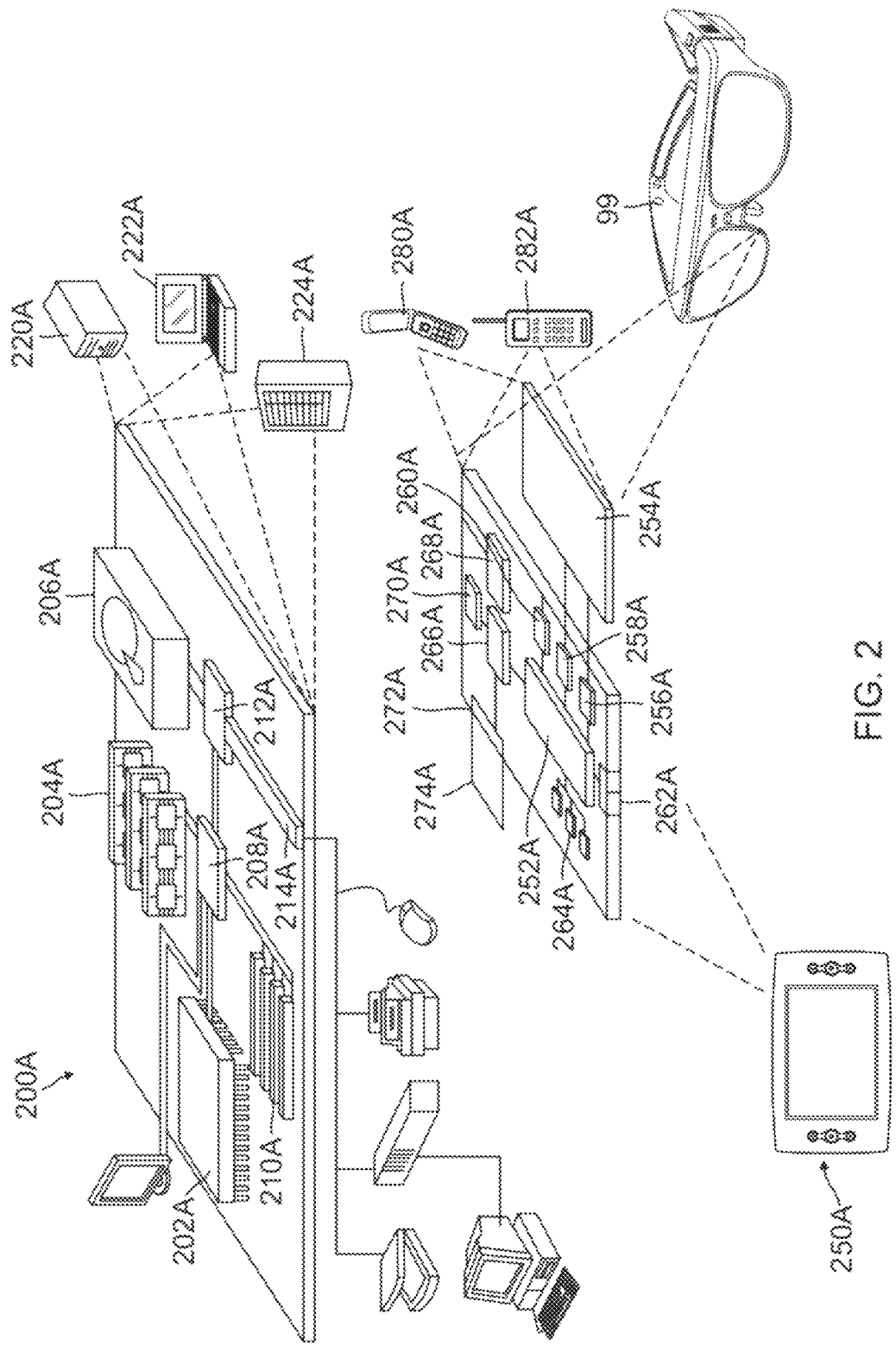
FIG. 2 is a flowchart showing integration of data management arrangements according to embodiments of the present invention.

Referring also to FIG. 2 is a block diagram showing example or representative computing devices and associated elements that may be used to implement the methods and serve as the apparatus described herein. FIG. 2 shows an example of a generic computing device 200A and a generic mobile computing device 250A, which may be used with the techniques described here. Computing device 200A is intended to represent various forms of digital computers, such as laptops, desktops, workstations, personal digital assistants, servers, blade servers, mainframes, and other appropriate computers. Computing device 250A is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

The memory 204A stores information within the computing device 200A. In one implementation, the memory 204A is a volatile memory unit or units. In another implementation, the memory 204A is non-volatile memory unit or units. In another implementation, the memory 204A is a non-volatile memory unit or units. The memory 204A may also be another form of computer-readable medium, such as a magnetic or optical disk.

The storage device 206A is capable of providing mass storage for the computing device 200A. In one implementation, the storage device 206A may be or contain a computer-200A. In one implementation, the storage device 206A may be or contain a computer-reading medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204A, the storage device 206A, or memory on processor 202A.

The high speed controller 208A manages bandwidth-intensive operations for the computing device 200A, while the low-speed controller 212A manages lower bandwidth-intensive operations, Artisans understand that ACDS 99 comprises any and all incorporated sensing, computer and optical and visual data management tools, and/or state of the art signal processing coupling and communication means. Such allocation of functions is exemplary only. In one implementation, the high-speed controller 208A is coupled to memory 204A, display 216A (e.g., through a graphics processor or accelerator), and to high-speed expansion ports 210A, which may accept various expansion cards (not shown). In the implementation, low-speed controller 212A is coupled to storage device 206A and low-speed bus 214A. The low-speed bus 214, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 200A may be implemented in a number of different forms, as shown in the figure. For example, it may be implemented as a standard server 220A, or multiple tunes in a group of such servers. It may also be implemented as part of a rack server system 224A. In addition, it may be implemented in a personal computer such as a laptop computer 222A. Alternatively, components from computing device 200A may be combined with other components in a mobile device (not shown), such as device 250A. Each of such devices may contain one or more of computing device 200A, 250A, and an entire system may be made up of multiple computing devices 200A, 250A communicating with each other.

Computing device 250A includes a processor 252A, memory 264A, an input/output device such as a display 254A, a communication interface 266A, and a transceiver 268A, along other components. The device 250A may also be provided with a storage device, such as a Microdrive or other device, to provide additional storage. Each of the components 250A, 252A, 264A, 254A, 266A, and 268A, are interconnected using various buses, and several of the components may be mounted on a common motherboard or in other manners as appropriate.

The processor 252A can execute instructions within the computing device 250A, including instructions stored in the memory 264A. The processor may be implemented as a chipset of chips that include separate and multiple analog and digital processors. The processor may provide, for example, for coordination of the other components of the device 250A, such as control of user interfaces, applications run by device 250A, and wireless communication by device 250A.

Referring now to FIGS. 4A-4C and 5A-5C schematic flow-charts show detailed operations inherent in subject software, as implemented in ACDS 99, or any related IOC, contact lenses or combinations thereof.

Figure 4A:
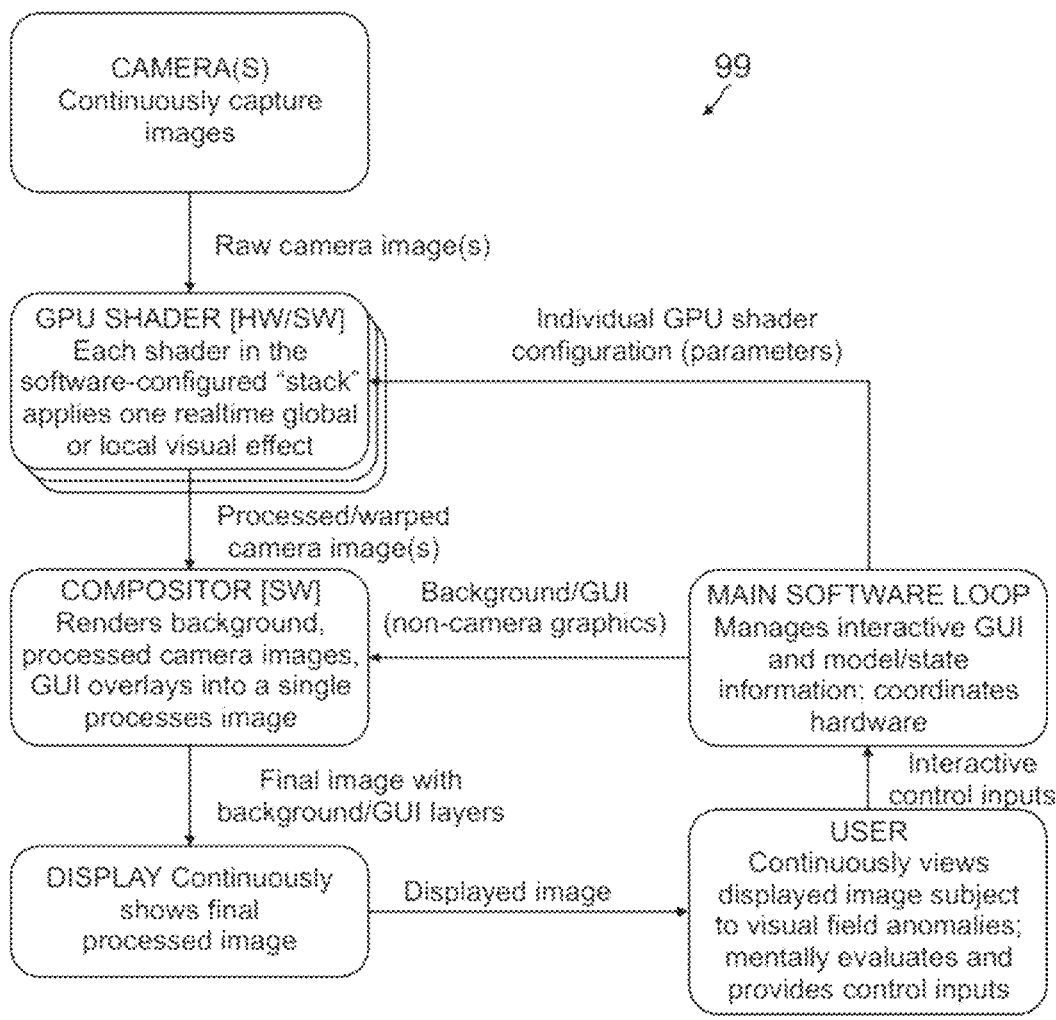
FIG. 4A is a flowchart showing camera and image function software.
Figure 4B:
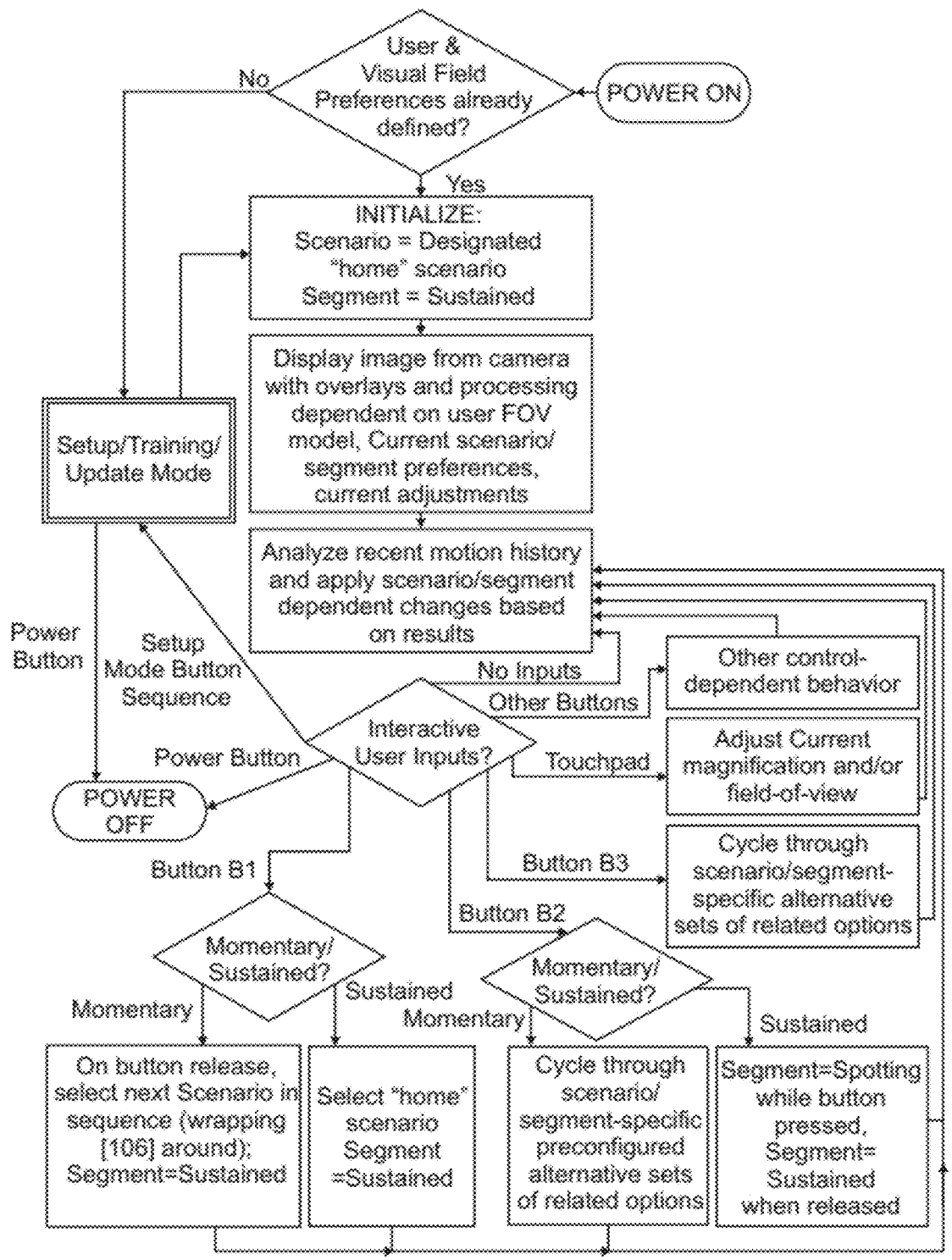
FIG. 4B is a flowchart showing higher order function software.
Figure 4C:
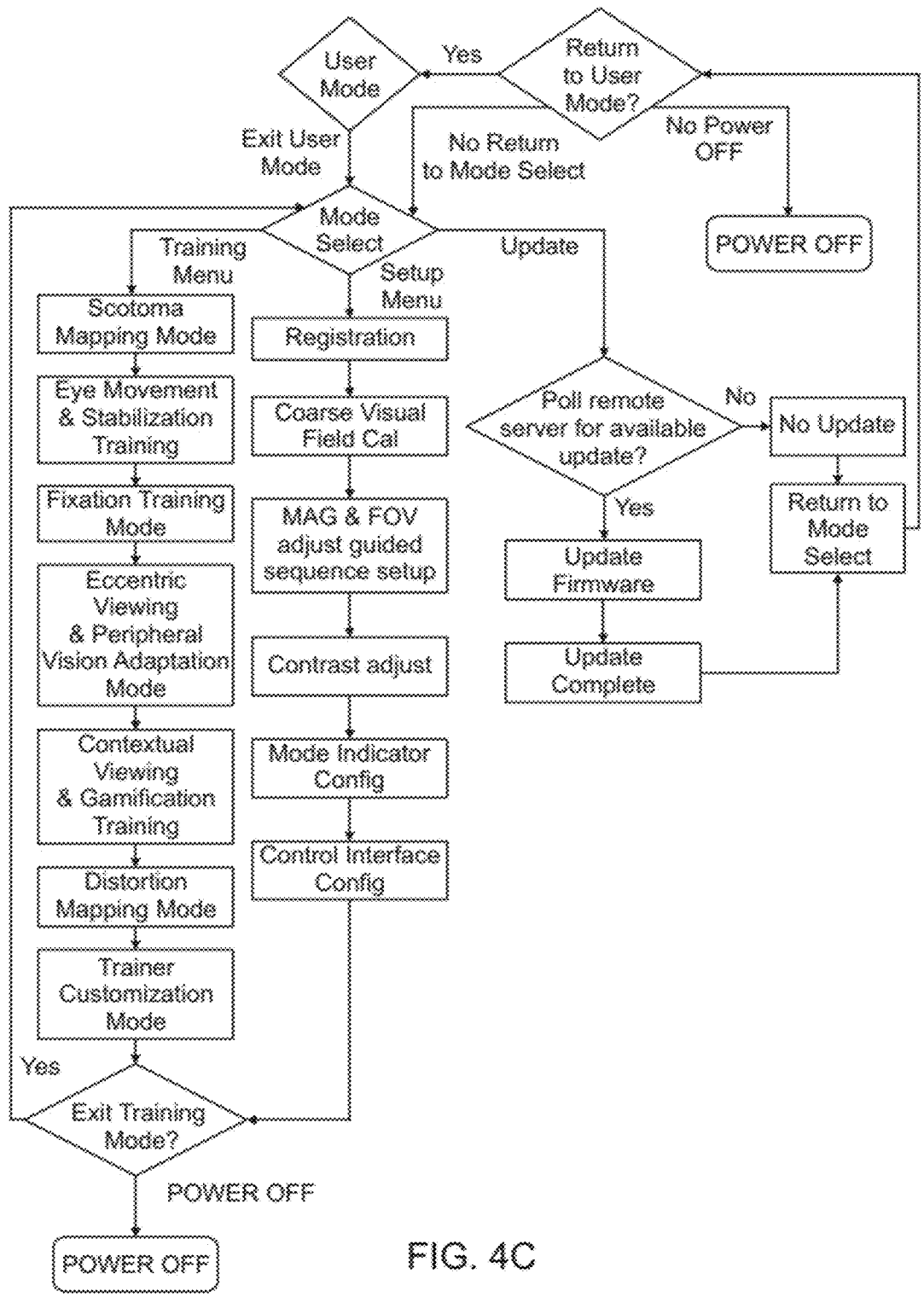
FIG. 4C is a flowchart showing higher order function software.

FIGS. 4A, 4B and 4C show how cameras, which continuously capture images are stored, manipulated and used with ACDS 9A. FIG. 4B shows sequences of operations once control buttons 106 are actuated including setup/training and update modes. FIG. 4C details users mode and FIG. 5A integrates displays with functional steps and shows setup, training and update interplay.

The basic hardware is constructed from a non-invasive, wearable electronics-based AR eyeglass system employing any of a variety of integrated display technologies, including LCD, OLED, or direct retinal projection. One or more cameras, mounted on the glasses, continuously monitor the view where the glasses are pointing. The AR system also contains an integrated processor and memory storage (either embedded in the glasses, or tethered by a cable) with embedded software implementing real-time algorithms that modify the images as they are captured by the camera(s). These modified, or corrected, images are then continuously presented to the eyes of the user via the integrated displays (see FIG. 4A).

The basic image modification algorithms come in multiple forms as described later. In conjunction with the AR hardware glasses, they enable users to enhance vision in ways extending far beyond simple image changes such as magnification or contrast enhancement. The fundamental invention is a series of adjustments that are applied to move, modify, or reshape the image in order to reconstruct it to suit each specific user's FOV and take full advantage of the remaining useful retinal area. The following disclosure describes a variety of mapping, warping, distorting and scaling functions used to correct the image for the end user.

Figure 4D:
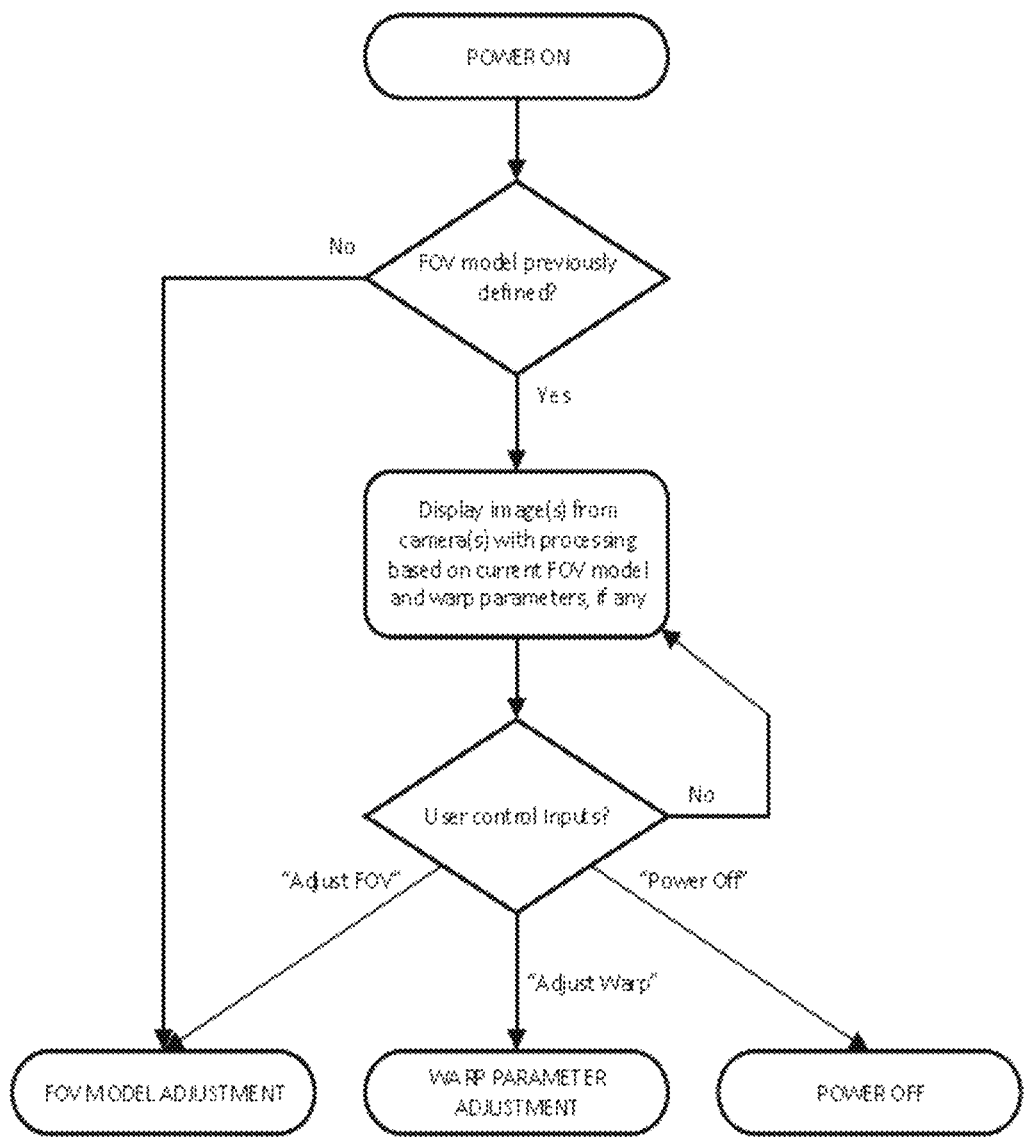
FIG. 4D is a flowchart allowing the user to interact directly with the corrected image and tailor its appearance for their particular condition or specific use case.

The invention places these fundamental algorithms under human control, allowing the user to interact directly with the corrected image and tailor its appearance for their particular condition or specific use case (see FIG. 4D). With this disclosure, such a detailed starting point derived from FOV measurements does not have to be supplied. Instead, an internal model of the FOV is developed, beginning with the display of a generic template or a shape that is believed to roughly match the type of visual impairment of the user. From this simple starting point the user adjusts the shape and size of the displayed visual abnormality, using the simple control interface to add detail progressively, until the user can visually confirm that the displayed model captures the nuances of his or her personal visual field. Using this unique method, accurate FOV tests and initial templates are not required. Furthermore, the structured process, which incrementally increases model detail, makes the choice of initial model non-critical.

The FOV model described above then becomes a template used for the warping of the image. Like the adjustments used to create the model, modifications to parameters that control warping are also interactively adjusted by the user. In addition to direct user control of the image modification coupled with instantaneous visual feedback, the software imposes a structured process guiding the user to address large-scale appearance before fine-tuning small details. This novel combination allows the user to tailors the algorithm precisely to his or her affected vision for optimal visual enhancement.

The following more fully describes the software methodology, which works in conjunction with the AR hardware, to realize the complete visual aid system.

Figure 5A:
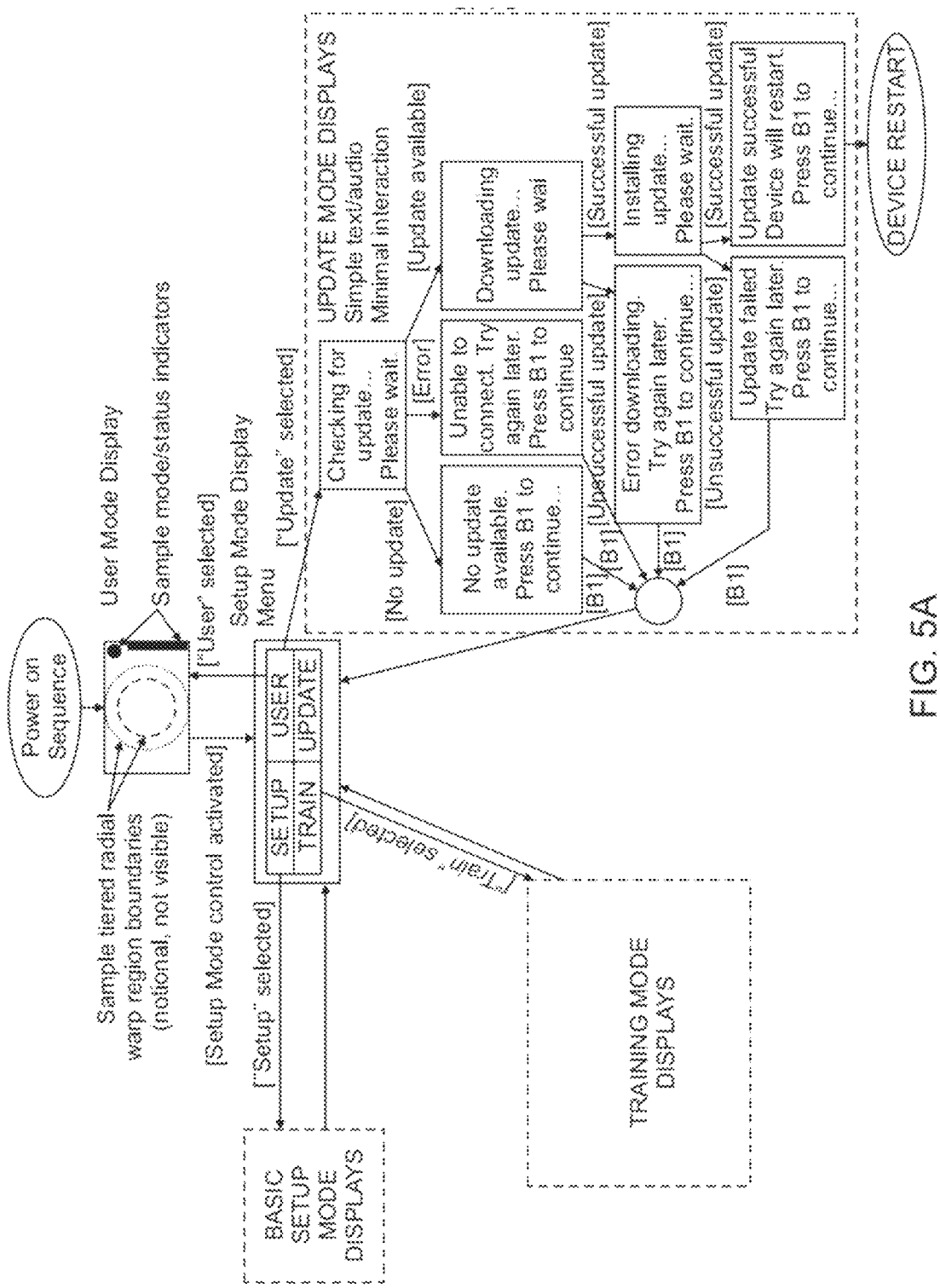
FIG. 5A is a schematic and flow chart showing user interface improvements.
Figure 5B:
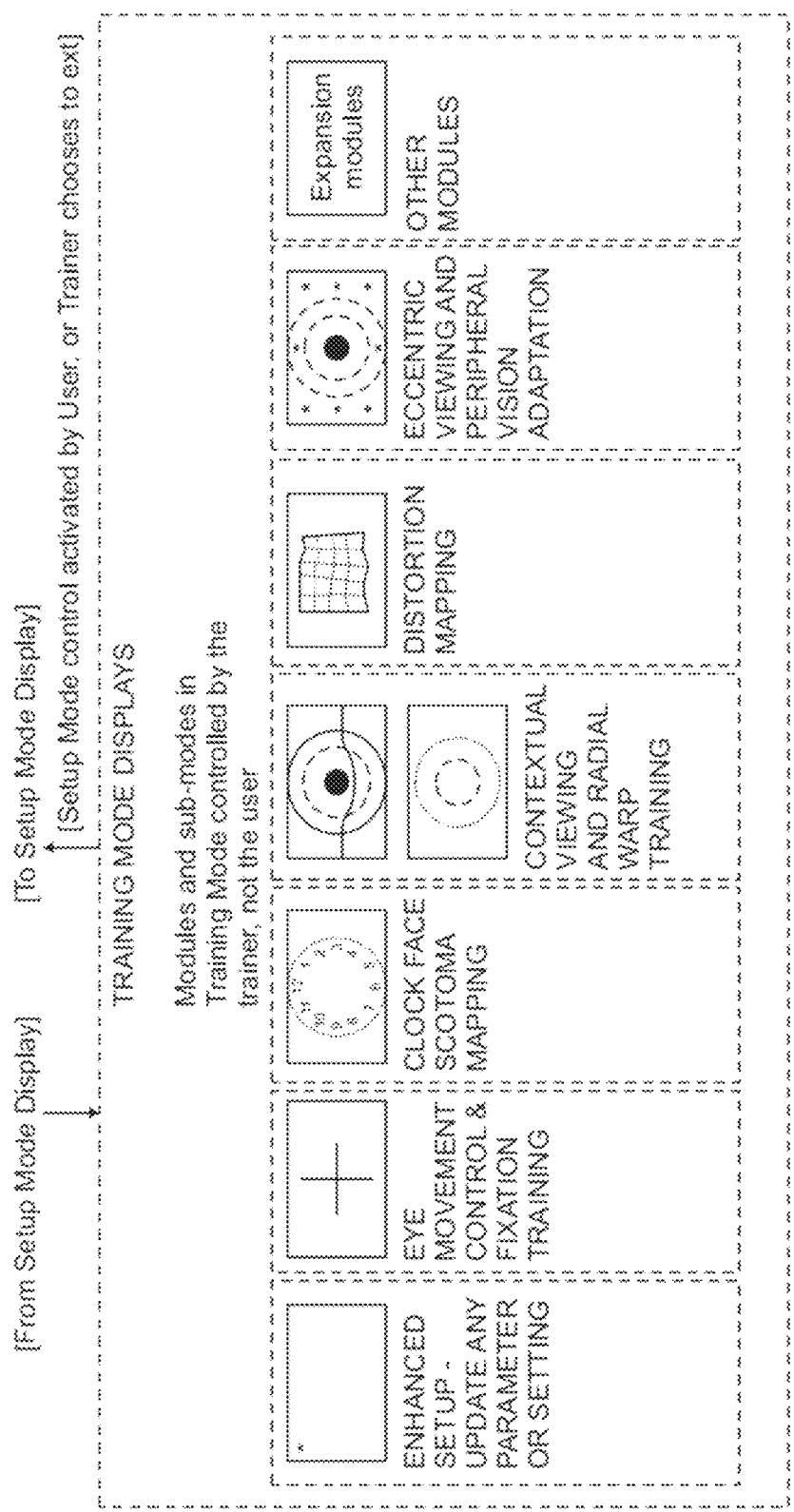
FIG. 5B is a schematic and flow chart showing user interface improvements.
Figure 5C:
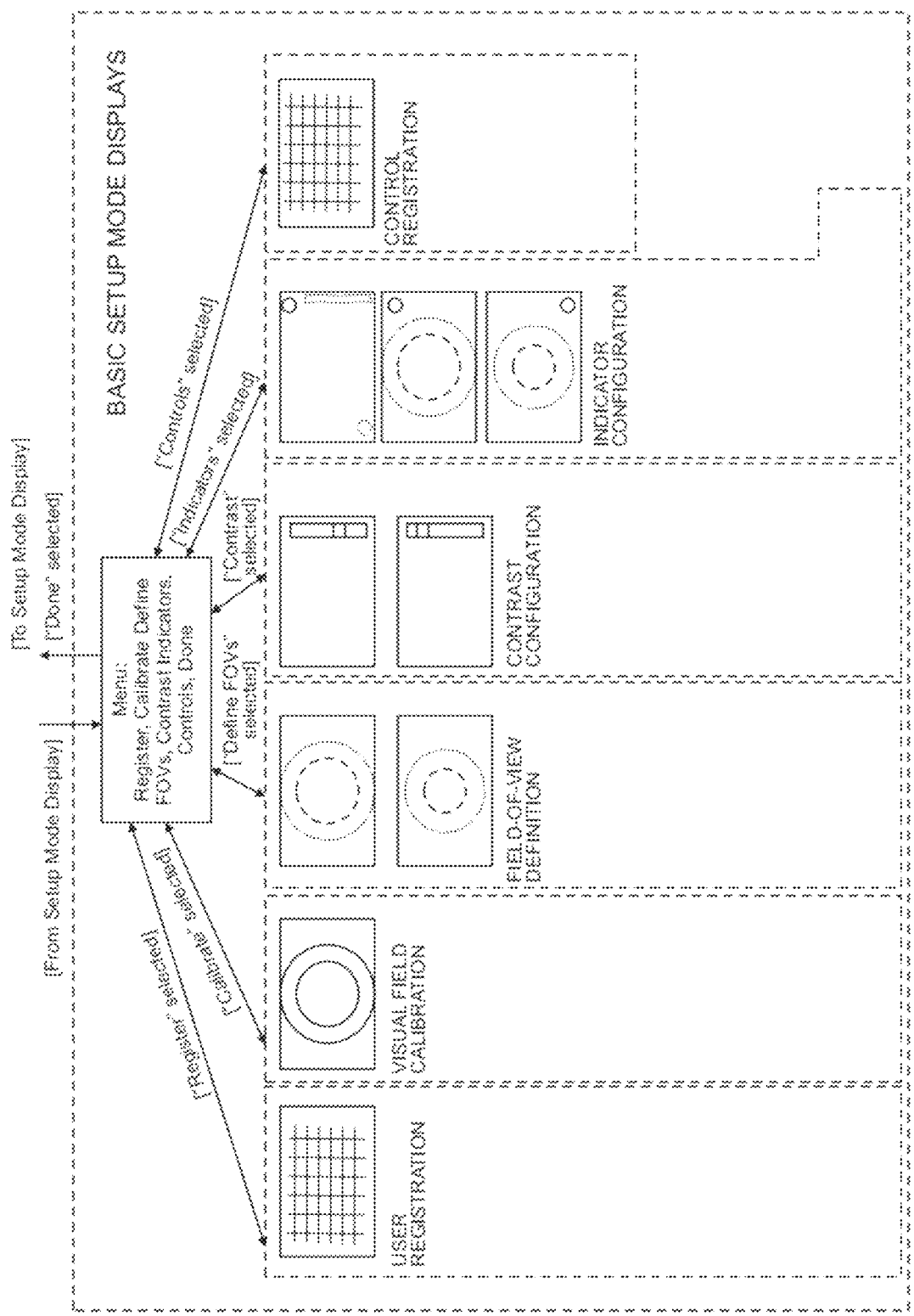
FIG. 5C is a schematic and flow chart showing user interface improvements.

Referring now to FIG. 5B, trainer controlled modules and sub-modes are illustrated whereby users learn to regain functional vision in placed imparted by their visual challenges. FIG. 5C completes a detailed overview of user interfacing as their own, to those skilled in the art with user registration, visual field calibration, VOV definition, contrast configuration and indicator configuration and control registration.

Processor 252A may communicate with a user through control interface 258A and display interface 256A coupled to a display 254A. The display 254A may be, for example, a TFT LCD (Thin-Film-Transistor Liquid Crystal Display) or an OLED (Organic Light Emitting Diode) display, or other appropriate display technology. The display interface 256A may comprise appropriate circuitry for driving the display 254A to present graphical and other information to a user. The control interface 258A may receive commands from a user and convert them for submission to the processor 252A. In addition, an external interface 262A may be provided in communication with processor 252A, so as to enable near area communication of device 250A with other devices. External interface 262A may provide for example, for wired communication in some implementations, or for wireless communication in other implementations, and multiple interfaces may also be used.

The memory 264A stores information within the computing device 250A. The memory 264A can be implemented as one or more of a computer-readable medium or media, a volatile memory unit or units, or a non-volatile memory unit or units. Expansion memory 274A may also be provided and connected to device 250A through expansion interface 272A, which may include, for example, a SIMM (Single In Line Memory Module) card interface. Such expansion memory 274A may provide extra storage space for device 250A, or may also store applications or other information for device 250A. Specifically, expansion memory 274A may include instructions to carry out or supplement the processes described above, and may include secure information also. Thus, for example, expansion memory 274A may be provided as a security module for device 250A, and may be programmed with instructions that permit secure use of device 250A. In addition, secure applications may be provided via the SIMM cards, along with additional information, such as placing identifying information on the SIMM card in a non-backable manner. The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 264A, expansion memory 274A, or memory on processor 252A, that may be received, for example, over transceiver 268A or external interface 262A.

Device 250A may communicate wirelessly through communication interface 266A, which may include digital signal processing circuitry where necessary. Communication interface 266A may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 268A. In addition, short-range communication may occur, such as using a Bluetooth, Wi-Fi, or other such transceiver (not shown). In addition, GPS (Global Positioning System) receiver module 270A may provide additional navigation- and location-related wireless data to device 250A, which may be used as appropriate by applications running on device 250.

Device 250A may also communicate audibly using audio codec 260, which may receive spoken information from a user and convert it to usable digital information. Audio codec 260A may likewise generate audible sound for a user, such as through a speaker, e.g., in a handset of device 250A. Such sound may include sound from voice telephone calls, may include recorded sound (e.g., voice messages, music files, etc.) and may also include sound generated by applications operating on device 250A.

The computing device 250A may be implemented in a number of different forms, as shown in the figure. For example, it may be implemented as part of ACDS 99 or any smart/cellular telephone 280A. It may also be implemented as part of a smart phone 282A, personal digital assistant, a computer tablet, or other similar mobile device.

Thus, various implementations of the system and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback; and input from the user can be received in any form, including acoustic, speech, or tactile input.

The systems and techniques described here can be implemented in a computing system (e.g., computing device 200A and/or 250A) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network) ("WAN") and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing devices 200A and 250A are configured to receive and/or retrieve electronic documents from various other computing devices connected to computing devices 200A and 250A through a communication network, and store these electronic documents within at least one of memory 204A, storage device 206A, and memory 264A. Computing devices 200A and 250A are further configured to manage and organize these electronic documents within at least one of memory 204A, storage device 206A, and memory 264A using the techniques described herein.

In addition, the logic flows depicted in the figures do not require the particular order shown, or sequential order, to achieve desirable results. Furthermore, other steps may be provided or steps may be eliminated from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included. For example, while online gaming has been referred to throughout, other applications of the above embodiments include online or web-based applications or other cloud services. Similarly, for example, VMWares future event failure systems approach may be used in conjunction with the instant systems.

Unless specifically stated otherwise as apparent from the above discussion, it is appreciated that throughout the description, discussions utilizing terms such as "processing" or "computing" or "calculating" or "determining" or "identifying" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within ACDS or within one or more computer-readable media, thereby making a computer program product, i.e., an article of manufacture, according to the discussed embodiments of the invention. The computer readable media may be, for instance, a fixed (hard) drive, diskette, electronic magnifier with on-board memory, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

Figure 3:
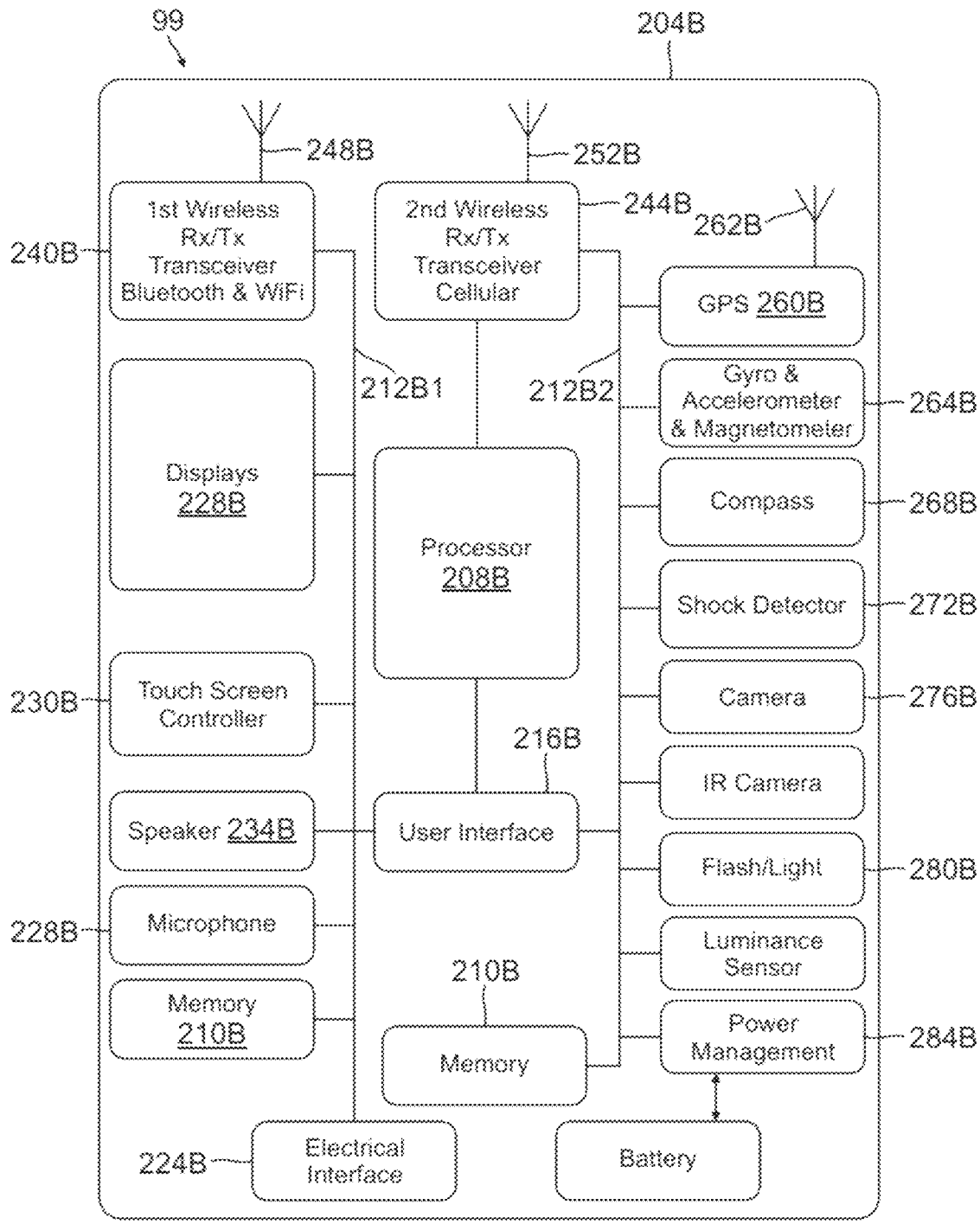
FIG. 3 is a flowchart illustrating interrelationship of various elements of the features of the present invention.

Referring now also to FIG. 3, another schematic is shown which illustrates an example embodiment of ACDS 99 and/or a mobile device 200B (used interchangeably herein). This is but one possible device configuration, and as such it is contemplated that one of ordinary skill in the art may differently configure the mobile device. Many of the elements shown in FIG. 3 may be considered optional and not required for every embodiment. In addition, the configuration of the device may be any shape or design, may be wearable, or separated into different elements and components. ACDS 99 and/or a device 200B may comprise any type of fixed or mobile communication device that can be configured in such a way so as to function as described below. The mobile device may comprise a PDA, cellular telephone, smart phone, tablet PC, wireless electronic pad, or any other computing device.

In this example embodiment, ACDS 99 and/or mobile device 200B is configure with an outer housing 204B that protects and contains the components described below. Within the housing 204B is a processor 208B and a first and second bus 212B1, 212B2 (collectively 212B). The processor 208B communicates over the buses 212B with the other components of the mobile device 200B. The processor 208B may comprise any type of processor or controller capable of performing as described herein. The processor 208B may comprise a general purpose processor, ASIC, ARM, DSP, controller, or any other type processing device.

The processor 208B and other elements of ACDS 99 and/or a mobile device 200B receive power from a battery 220B or other power source. As discussed, it is contemplated that use of superconductive materials for super batteries is incorporated or implemented in ACDS, see, for example, LAMBORGHINI/MIT battery-type of functional elements by using materials which store and release energy, at room temperature output like batteries with other technical benefits are outlined. An electrical interface 224B provides one or more electrical ports to electrically interface with the mobile device 200B, such as with a second electronic device, computer, a medical device, or a power supply/charging device. The interface 224B may comprise any type of electrical interface or connector format.

One or more memories 210B are part ACDS 99 and/or mobile device 200B for storage of machine readable code for execution on the processor 208B, and for storage of data, such as image data, audio data, user data, medical data, location data, shock data, or any other type of data. The memory may store the messaging application (app). The memory may comprise RAM, ROM, flash memory, optical memory, or micro-drive memory. The machine-readable code as described herein is non-transitory.

As part of this embodiment, the processor 208B connects to a user interface 216B. The user interface 216B may comprise any system or device configured to accept user input to control the mobile device. The user interface 216B may comprise one or more of the following: keyboard, roller ball, buttons, wheels, pointer key, touch pad, and touch screen. A touch screen controller 230B is also provided which interfaces through the bus 212B and connects to a display 228B.

The display comprises any type of display screen configured to display visual information to the user. The screen may comprise an LED, LCD, thin film transistor screen, OEL, CSTN (color super twisted nematic), TFT (thin film transistor), TFD (thin film diode), OLED (organic light-emitting diode), AMOLED display (active-matrix organic light-emitting diode), capacitive touch screen, resistive touch screen or any combination of these technologies. The display 228B may further comprise a display processor (not shown) or controller that interfaces with the processor 208B. The touch screen controller 230B may comprise a module configured to receive signals from a touch screen which is overlaid on the display 228B. Messages may be entered on the touch screen 230B, or the user interface 216B may include a keyboard or other data entry device.

Also part of this exemplary mobile device is a speaker 234B and microphone 238B. The speaker 234B and microphone 238B may be controlled by the processor 208B and are configured to receive and convert audio signals to electrical signals, in the case of the microphone, based on processor control. Likewise, processor 208B may activate the speaker 234B to generate audio signals. These devices operate as is understood in the art and as such are not described in detail herein. Expressly incorporated herein is the system of U.S. Pat. No. 9,782,084, as mentioned above, Artisans understanding that remote devices, sensors, and interactive communication tools are readily interface into, and data-friendly with ACDS 99.

Also connected to one or more of the buses 212B is a first wireless transceiver 240B and a second wireless transceiver 244B, each of which connect to respective antenna 248B, 252B. The first and second transceiver 240B, 244B are configured to receive incoming signals from a remote transmitter and perform analog front end processing on the signals to generate analog baseband signals. The incoming signal may be further processed by conversion to a digital format, such as by an analog to digital converter, for subsequent processing by the processor 208B. Likewise, the first and second transceiver 240B, 244B are configured to receive outgoing signals from the processor 208B, or another component of the mobile device 208B, and up-convert these signals from baseband to RF frequency for transmission over the respective antenna 248B, 252B. Although shown with a first wireless transceiver 240B and a second wireless transceiver 244B, it is contemplated that the mobile device 200B may have only one such system or two or more transceivers. For example, some devices are tri-band or quad-band capable, or have Bluetooth and NFC communication capability.

It is contemplated that ACDS 99 and/or a mobile device, and hence the first wireless transceiver 240B and a second wireless transceiver 244B may be configured to operate according to any presently existing or future developed wireless standard including, but not limited to, Bluetooth, Wi-Fi such as IEEE 802.11 a,b,g,n, wireless LAN, WMAN, broadband fixed access, WiMAX, any cellular technology including CDMA, GSM, EDGE, 3G, 4G, 5G, TDMA, AMPS, FRS, GMRS, citizen band radio, VHF, AM, FM, and wireless USB.

Also part of ACDS 99 and/or a mobile device is one or more system connected to the second bus 212B which also interfaces with the processor 208B. These devices include a global positioning system (GPS) module 260B with associated antenna 262B. The GPS module 260B is capable of receiving and processing signals from satellites or other transponders to generate location data regarding the location, direction of travel, and speed of the GPS module 260B. GPS is generally understood in the art and hence not described in detail herein.

A gyro 264B connects to the bus 212B to generate and provide orientation data regarding the orientation of the mobile device 204B. A compass 268B, such as a magnetometer, provides directional information to the mobile device 204B. A shock detector 272B, which may include an accelerometer, connects to the bus 212B to provide information or data regarding shocks or forces experienced by the mobile device. In one configuration, the shock detector 272B generates and provides data to the processor 208B when the mobile device experiences a shock or force greater than a predetermined threshold. This may indicate a fall or accident, again reference to the Device of U.S. Pat. No. 9,782,084 and communication systems and methods apply herein.

One or more cameras (still, video, or both) 276B are provided to capture image data for storage in the memory 210B and/or for possible transmission over a wireless or wired link or for viewing at a later time. The processor 208B may process image data to perform the steps described herein.

A flasher and/or flashlight 280B are provided and are processor controllable. The flasher or flashlight 280B may serve as a strobe or traditional flashlight, and may include an LED. A power management module 284 interfaces with or monitors the battery 220B to manage power consumption, control battery charging, and provide supply voltages to the various devices which may require different power requirements.

Eccentric Viewing & Peripheral Vision Adaptation—Further modules are included to guide the trainer and user in order for the user to more effectively and consistently utilize their peripheral vision. This includes more quickly adapting to the most effective eccentric viewing technique and preferred retinal locus.

Contextual Viewing & Inclusion with Hybrid Distortion—In order to better utilize the full FOV of the augmented reality device and take advantage of the nonlinear transformations that maximize the field of vision, this training module to help the user understand and adapt to this view is utilized.

Gamification of Training—The above modules can be gamified to help the user practice and improve over time. Many such games can be constructed to help improve fixation, eccentric viewing, contextual viewing and adaptation.

Distortion Mapping—As described elsewhere, when distortion is present in a user's field of view, a mapping can be interactively fashioned to reflect the details of this distortion. In training mode this map can be constructed with help of the trainer/specialists for later use to undistort the user's vision.

Training Mode also functions as a greatly-enhanced Setup Mode, providing a trained facilitator with a number of graphical user interface tools for tailoring the device to a specific user's requirements. Whereas the standard Setup Mode provides a low-complexity route to semi-custom settings suitable for a class of users who make the same choices in Setup Mode, Training Mode allows for detailed customization to the specific user.

Referring now to FIGS. 4B, 4C, 5A, 5B & 5C, for example, the facilitator can narrow down the wide array of possible parameter combinations presented by the device by choosing from a set of tool palettes that contain archetypical configurations for various conditions, e.g., Age-related Macular Degeneration, Retinitis Pigmentosa, etc. This initial choice subsequently determines the baseline scenarios selected for User Mode. Additional adjustments made during Training mode can automatically fine-tune these for the user. The initial choice also restricts the suggested processing options to help the trainer test and evaluate their utility for the specific user, but the facilitator always has the option of incorporating any feature combination into a user's configuration.

Update Mode

When update mode is entered from Setup Mode, the operator can initiate a request to check for available software updates or patches. The device will attempt to satisfy this request by connecting to a remote server via an available wireless or tethered interface. If the device is not up-to-date, the user will be asked to confirm a desire to perform the update. Once confirmed, the update will occur automatically.

Interrupted updates that are recoverable (e.g., due to loss of connection) will prompt the operator for a decision about continuing or returning to Setup Mode. Unrecoverable interruptions (e.g., loss of power) will require a restart into User Mode, and will be accompanied by a warning message.

Overview & Modes

The User Interface for the Eyedaptic AR glasses, taking advantage of Hybrid See Through technology, (described in a separate provisional patent filing) offers several modes for either the user or trainer. Many of these feature unique constructs and methodologies to address usage with a variety of retinal diseases such as macular degeneration. These combine advanced functions to enable adaptations tailored to the user's particular affliction and its progression along with a simple and easy to use control interface for everyday usage in a variety of settings. The supported modes are: User Mode—The AR visual aid automatically boots into this mode upon power up. Setup Mode—A specific sequence and/or combination of buttons (or a specific physical or wireless connection) places the visual aid into a setup mode for user or trainer control of the visual field and user controls. Setup Mode is also the gateway to Training and Update Modes. Training Mode—When in Setup Mode, a specific sequence and/or combination of buttons (or a specific physical or wireless connection) places the visual aid into a training mode intended for use by a trained Low Vision Specialists to help the user adapt and to customize settings for the user. Update Mode—This is a separate mode, also entered from Setup Mode, that supports software updates and patches as well as restoration of user settings to a previous configuration.

User Mode

For everyday operation by the end-user, the inherent range of features and capabilities of the device is balanced against its utility by providing a simple and responsive user interface that provides instantaneous access to the most commonly-used functionality.

This is accomplished by defining overarching use-case templates, or scenarios. A single button B1 located on the eyewear controls the current scenario: a short button-push cycles through the available scenarios in a fixed order, while a prolonged (e.g., one-second) button-press immediately selects a predefined "home" scenario. Sufficiently dexterous users can associate other sequences (e.g., appropriately-timed "double-clicks," etc.) with specific scenarios, but otherwise multiple pushes provide cycling behavior to avoid causing confusion and frustration for users with less developed fine motor skills.

Each scenario corresponds to a common vision-related use-case or set of similar use-cases. For example, the device ships preconfigured with three use-case templates:

A "plain" scenario that does not apply any processing to the input image (until further customized) preconfigured as the default "home" scenario;

A "wide" scenario—suitable (e.g.) for navigating indoors, or watching television—where tiered radial warping is configured with a medium-sized inner circle and moderate magnification so that objects can be recognized at a distance while still maintaining context;

A "narrow" scenario—suitable for reading and other close-in work—where tiered radial warping is configured with a relatively large inner circle and high magnification.

Additional scenarios can be added in Setup Mode. Because User Mode operation always falls within the context of one of these mutually-exclusive templates, a visual cue is needed to orient the user; a color-coded border or partial-border indicates the currently-selected scenario (e.g., no border for "plain," a green border for "wide," and a red border for "narrow"). Colors can be reassigned according to preference and for mnemonic value (e.g., "red" to suggest the "reading" use-case), but clearly fewer scenarios are inherently more manageable.

Transitions between scenarios are effected by gradually and smoothly varying the parameters of the various relevant processing effects (e.g., magnification, amount of contrast enhancement, radii in tiered warps). Using a brief but obvious animation gives the user a visual indication of the changes that are occurring. When applicable, further screen annotations can further point out the modifications, e.g., a visible circle that animates to show ac hanging radius. When the user is quickly cycling past multiple scenarios, such animations can be deferred until a final selection is determined.

Every scenario is bipartite, comprising one segment used "sustained" viewing and another for "spotting." Each segment possesses a full set of parameters that can be independently chosen, but are most advantageously selected for complementary usage (as demonstrated by the default preconfigured scenarios, below). When the user activates a scenario, the sustained subset of parameters is applied. A prolonged press of a second device-mounted button B2 changes parameters to the corresponding spotting subset (with accompanying animation); conversely, releasing the button restores sustained settings once again. No border color change or other indicator marks transitions between sustained and spotting segments since they are always coincident with direct user manipulation of button B2. Spotting mode is normally transient, but a discrete command (separate button or voice command) can be used to lock in place indefinitely, until released by a complementary command or B2—an additional unique display element or pattern will unambiguously indicate the locked configuration.

The table below illustrates one possible baseline configuration for the three default scenarios, where sustained and spotting characteristics are chosen to complement each other. Consider the "narrow" scenario, primarily intended for reading or similar close-up work using the sustained subset. When tailored to the individual, this reading-optimized sustained configuration might include color mapping or binarization to give high-contrast two-level images. Occasionally, the user may desire to look up and examine the environment or interact with another person without experiencing visual processing artifacts best suited to text processing; the spotting mode expedites reducing magnification and restoring a more natural, less distorted field of view with no color changes for this purpose. This can be further facilitated with automatic adaptive shifting between spotting and sustaining modes, which is discussed later. The other sample scenarios presented here exemplify use-cases where it is desirable to apply more magnification temporarily.

| Scenario | Primary Usage | Sustained Segment | Spotting Segment |
|---|---|---|---|
| "Plain" | Outdoors | No processing [Outdoor navigation] | Tiered radial warp with medium inner radius and high zoom [Reading street signs] |
| "Wide" | Indoors, navigation, TV | Tiered radial warp with medium inner radius and moderate magnification [Indoor navigation, TV] | Tiered radial warp with medium/large inner radius and high magnification [Reading text on TV] |
| "Narrow" | Reading, close-up viewing | Tiered radial warp with large inner radius, high magnification, strong contrast enhancement or binarization/ color mapping [reading] | Tiered radial warp with medium inner radius and moderate magnification, no color mapping [looking around, turning page] |

There are two keys to success with a strategy built upon a small number of templates. The first is per-user customization. During setup mode, a user customizes each of the scenarios to the peculiarities of his vision, viz. the location and size of visual defects, tiered radial warp configuration, preferred amount of magnification, and desired enhancements to contrast or color. This allows the fewest number of presses (of a single button) to reach the most commonly desired personal configurations without delay.

The second key to success is supporting further modification within the existing template. Two additional buttons provide this capability.

Button B2, when pressed quickly instead of being held down, cycles through or selects within a fixed set of changes. The specific set of changes is fully customizable, even to the point of radically altering the nature of the display. Once again, however, the device remains more usable when easily-remembered or predicted choices are made. For example, in a scenario defined for reading (e.g., the "narrow" scenario above), it is sensible to have B2 cycle through a small number of contrast-enhancement selections, e.g., low enhancement, high enhancement, inverted video, binarization, and inverted binarization. Setup Mode and Training Mode offer a menu of predefined pallets for common tasks.

Button B3 works like B2, but has its own collection of settings. For the reading-related scenario, B3 could be defined (e.g.) to toggle reference guide lines on and off independently of any other settings.

A fourth control facilitates further fine-tuning of magnification and/or tiered radial warp internal radius. This control is a touch-pad that allows continuous fine adjustment of parameters. By sliding a finger back and forth on the button along one axis (e.g., parallel to the side of the head), the magnification can be changed. Sliding along the other axis (i.e., left-to-right) manipulates the size of the magnified circle. To reduce complexity, the outer circle radius automatically changes along with the inner circle radius in a predefined non-linear fashion. For some users, having two controls share a single touchpad is untenable; in that case, Setup Mode can configure the touchpad to control only magnification directly, and both radii will then be automatically adjusted in conjunction.

The four-control (B1, B2, B3, and touchpad) user interface described above exists to provide a minimum viable control mechanism to all users. Its existence is crucial because the presence of an external controller or online data service connection cannot be guaranteed. Some users will be unable to maintain external hardware reliably without misplacing it; other will lack the dexterity or visual ability to use one. When possible, additional buttons will be provided. Additionally, the Eyedaptic visual aid affords a wide variety of control interfaces for more sophisticated and determined users. These interfaces provide fine-grained access to all features and capabilities, and include voice access for spoken commands and responses, handheld Bluetooth controllers, mobile phone or tablet-based applications, and Wi-Fi-based control by computers or other devices. Any of the remote devices can incorporate virtual graphical user interfaces, command-line or scripted interfaces, physical switches and other physically-manipulated controls, or motion-sensing devices. Supporting Wi-Fi, Bluetooth, and other wireless communication schemes also means that controls can originate at great distances.

Because the device incorporates motion sensors, they are also part of the user interface. Movements can trigger behavior dependent on the scenario. For example, when operating in a sustained scenario for reading or other close-up work, large head motions can be caused to trigger a switch to associated spotting parameters, allowing the user to re-orient his view; once large-scale motions cease, an automatic return to the sustained reading configuration will occur after a suitable programmed delay. As a more complex example, the amount of magnification can be adjusted to be proportional to the amount of head motion. Automatic image stabilization, which depends in part on these embedded motion sensors, can also be associated with a specific subset of scenarios.

With the addition of more interfaces and controls comes even greater flexibility. One important feature that requires more than the minimal user interface is the "floating" scenario. As described above, the touchpad and B2/B3 can be used to fine-tune a scenario. However, such changes are ephemeral, and will be lost as soon as B1 is used to change the scenario. A permanent change to the default settings for a scenario requires returning to Setup Mode. As an expedient alternative, the current configuration can be instantly stored into a designated "floating" scenario via a single button press, voice command, or other well-defined control activation. This allows the user to tailor a custom configuration on-the-fly, creating a corresponding pair of sustained/spotting configurations suited to a specific task without entering Setup Mode. Once created, the floating scenario behaves just like any other scenario except that it retains any changes made to it.

Another advanced feature that needs to be voluntarily activated is "autozoom," or automatic magnification based on text size. In a scenario that is intended to be a reading context (either sustained or spotting), when this feature is activated the images are scanned to look for text or text-like features in the high-acuity portion of the wearer's field of view. A standard Computer Vision/Optical Character Recognition technique such the well-known Stroke Width Transform can be used to locate these features. When detected, the magnification level and/or field-of-view is adjusted to increase small text to the preferred text size for reading. The magnification is never permitted to change too quickly, and is restored to a neutral setting when large head movements are detected. Autozoom can operate fully autonomously, or can be activated in a one-shot fashion by a command.

Note that relatively few distinct features converge in this device to give it tremendous power in User Mode without producing overwhelming complexity. A summary of set of independent features displayed in User Mode follows:

Selectable scenarios with user defined contents, but typically based on generic, widely-applicable and archetypical templates that are tailored to user preferences.

Single-button rapid cycling through available scenarios.

Single-button expedited selection of a designated "home" scenario.

Animated transitions to avoid disorientation.

Scenario indicator via a colored border or partial border.

Additional two button controls cycle through scenario-dependent options (user-tailored behavior).

"Floating" scenario that can be defined on-the-fly.

Single button or other designated control (not part of minimal interface) to snapshot current configuration as "floating" sustained or spotting parameters.

Floating scenario retains all changes made to it.

Unique complementary sustained vs. spotting segments comprising each bipartite scenario.

Single-button switching between sustained and spotting behaviors.

Motion-based switching between sustained and spotting behaviors (not necessarily symmetric).

Ability to lock or unlock spotting mode (which is normally transient) via a discrete command.

Unambiguous additional displayed element or pattern indicates locked configuration.

Animated transitions to avoid disorientation.

Tiered radial warping (described in detail elsewhere) with continuous field-of-view and magnification adjustment.

Touchpad control of FOV and magnification parameters in real-time.

Magnification, inner, and outer radius parameters individually controlled, OR

Magnification and inner radius individually controlled with outer radius automatically adjusted in a consistent and visually pleasing way, OR Magnification individually controlled, with the two radii automatically adjusted in a consistent and visually pleasing way.

Automatic magnification adjustment based on head movement, with increased FOV and decreased magnification accompanying larger movements Basic contrast adjustment (for global contrast)

Local contrast adjustment using unsharp masking to induce prominent high-contrast halos ("Britext") at image transitions, particularly text, in order to improve reading ability and speed; although this is a continuously-varying parameter, it is anticipated that any given user will prefer to use a small number of settings (e.g., "moderate" and "very high").

Setup Mode

This mode can be entered from User Mode, and can be utilized by the user, the trainer, or someone helping the user to configure their device. This mode supports not only initial setup and registration plus later configuration changes to override existing User Mode settings, but also constitutes a prerequisite gateway to the other special-purpose modes, Training Mode and Update Mode, which can only be entered from Setup Mode.

Functions provided here are deliberately limited to avoid confusing the untrained user, but still provide a high degree of utility and customizability. The determined and capable user can perform further customizations by entering Training Mode.

Setup Mode functions are:

Registration—User data such as name, date, contact information, etc. is entered. This does not typically change after initial setup, but can be updated as desired.

Rough calibration of visual field—A short device-directed exercise is used to obtain a very rough estimate of the size, shape, and placement of a central scotoma or other visual field defect for later use in automatically adapting the processing to the user's visual characteristics.

Magnification and FOV—A short device-directed exercise is used to help the user select desired amounts of magnification under conditions simulating typical visual tasks, such as reading or navigating. Field of view is automatically adjusted based on requested magnification, with the exact formula depending on the measured visual field. Preferred text size is also configured here for use with automatic zooming.

Contrast—A short device-directed exercise assists the user in selecting preferred contrast enhancements under conditions simulating typical visual tasks that often require improved contrast (e.g., reading).

Mode indicator configuration—Allows the user to override the automatic choices made for indicating mode changes in the display; typically the user will adjust this to obtain mnemonically-useful results, e.g., "red" for "reading."

Control interface—The user can enable or disable voice control, external controllers, and other control-related options (e.g., to limit the control scheme in User Mode for a low-dexterity user).

For the most part, the basic Setup Mode makes a large number of complex processing decisions based on a small number of interactive user decisions. The result is expected to be satisfactory for a majority of users; those who desire further customization must turn to Training Mode.

Training Mode

This mode is targeted for trainers, usual Low Vision Specialists or Occupational Therapists who help the users with their low vision training. This offers the capabilities of Setup Mode available to either the trainer or user, but layers on many novel features. During training mode, the trainer has external control of the device via a wirelessly-linked console or tablet. He or she can monitor what the camera captures by using an external display, and can also provide the wearer with alternate visual displays or overlayed annotations that aid in the training process. The trainer directs the flow of the training session, giving limited control to the wearer only for the purpose of making user-directed responses or adjustments under guidance. User-based control of the state (mode) is limited to abandoning Training Mode via the same control sequence that initiates Setup Mode; this facility is provided mainly for the case where Training Mode has been accidentally activated.

Features used to both calibrate the user's affliction as well as to provide various training aspects for the user for more effective use of the AR visual aid include the following:

Initial setup (see Setup Mode)—Before entering training mode the trainer will enter into setup mode for initial setup of data entry, registration and default user settings.

Clock face scotoma mapping—This module gives the ability to establish a rough map of the users scotoma or visual defect in order to better understand their low vision affliction and needs. The clock face methodology, which presents only the numbers associated with a traditional clock face, is instantly recognizable and relatable to most users. Once a rough mapping of a visual field defect is established based on visibility of numbers at the standard twelve positions on a clock faces of various sizes, those same positions can be used to grade acuity further by varying the brightness or size of the numbers, or using the well-known "oriented-E" technique.

Eye movement control & fixation training—This module guides the user in a training regime in order to better control eye movement and fixation in order to optimize usefulness of the augmented reality device. This includes displayed guide lines and targets to help both the user and trainer. It may also include eye tracking in order for the trainer to better understand the user's particular needs.

Eccentric Viewing & Peripheral Vision Adaptation—Further modules are included to guide the trainer and user in order for the user to more effectively and consistently utilize their peripheral vision. This includes more quickly adapting to the most effective eccentric viewing technique and preferred retinal locus.

Contextual Viewing & Inclusion with Hybrid Distortion—In order to better utilize the full FOV of the augmented reality device and take advantage of the nonlinear transformations that maximize the field of vision, this training module to help the user understand and adapt to this view is utilized. This feature also supports training for reading in the presence of the nonlinear transformation, both with and without the presence of reference guidelines.

Gamification of Training—The above modules can be gamified to help the user practice and improve over time. Many such games can be constructed to help improve fixation, eccentric viewing, contextual viewing and adaptation.

Distortion Mapping—As described elsewhere, when distortion is present in a user's field of view, a mapping can be interactively fashioned to reflect the details of this distortion. In training mode this map can be constructed with help of the trainer/specialists for later use to undistort the user's vision.

Training Mode also functions as an Enhanced Setup Mode, providing the trained facilitator with a number of graphical user interface tools for tailoring the device to a specific user's requirements. Whereas the standard Setup Mode provides a low-complexity route to semi-custom settings suitable for an equivalence-class of users who make the same choices in the basic Setup Mode, Training Mode allows for detailed customization to the specific user. Whenever none of the special training module functions is engaged, the device is nominally providing this Enhanced Setup capability. During this period, it displays a distinctive "Training Mode" status indicator but responds to standard user inputs as if in User Mode; however, the trainer can also manipulate the configuration. In fact, the trainer is permitted to enable, disable, or adjust any feature or mode at any time, even during the execution of a training module. This freedom allows is issues to be addressed or experiments to be performed without having to suspend the current activity.

For example, the facilitator can narrow down the wide array of possible parameter combinations presented by the device by choosing from a set of tool palettes that contain archetypical configurations for various conditions, e.g., Age-related Macular Degeneration, Retinitis Pigmentosa, etc. This initial choice subsequently determines the baseline scenarios selected for User Mode. Additional adjustments made during Training mode can automatically fine-tune these for the user. The initial choice also restricts the suggested processing options to help the trainer test and evaluate their utility for the specific user, but the facilitator always has the option of incorporating any feature combination into a user's configuration.

Update Mode

When update mode is entered from Setup Mode, the operator can initiate a request to check for available software updates or patches. The device will attempt to satisfy this request by connecting to a remote server via an available wireless or tethered interface. If the device is not up-to-date, the user will be asked to confirm a desire to perform the update. Once confirmed, the update will occur automatically.

Interrupted updates that are recoverable (e.g., due to loss of connection) will prompt the operator for a decision about continuing or returning to Setup Mode. Unrecoverable interruptions (e.g., loss of power) will require a restart into User Mode, and will be accompanied by a warning message.

Automated FOV (Field of Vision) Measurement & Defect Characterization

There are many established methods of characterizing the human visual field and its defects to varying degrees. Generally, they are intended to produce a diagnostic model of the subject's visual field that is both precise and accurate; subsequently, the apparatus and methodology for obtaining the numerical measurements that comprise this model tend to be complex, expensive, and time-consuming.

The method to be described below somewhat resembles an established technique known as Goldmann Visual Field perimetry (GFA). Using GFA, the subject views a uniformly lit background, very similar to the environment of the more common HVFA. Instead of being shown random point-flashes of light with varying intensity, the subject views each member from a small set of projected concentric circles having controlled intensity and gradually increasing radius. Working closely with the perimetrist, a contour map of visual field sensitivity is painstakingly constructed by noting which circles first become visible as the radius is adjusted; for each intensity, data is collected at a handful of radial angle and interpolated to sketch the isolines in the contours. It is commonly remarked that GFA is less widespread than HVFA due to the requirement of a highly skilled technician.

This method can produce a similar but superior visual field representation in a way that fully automates the calibration and measurement process, eliminating all dependencies on skilled personnel or highly-specialized equipment while allowing an unassisted and untrained subject to obtain the desired results. Similarities with GFA are actually superficial since underlying implementation, methodology, and philosophy are entirely different; the specific AR/VR-based realization removes many practical limitations associated with GFA and can potentially achieve higher levels of detail, precision, accuracy, and repeatability. Furthermore, when reduced-complexity modeling is adequate, implementation requirements can be further simplified—hence the approach is highly scalable in complexity, performance, and resource cost.

Model Representation

Since the techniques to be described here constructs and manipulates a visual field model, it is necessary to present some background information about this model. There are numerous ways to embody such a model, all varying in convenience and utility with respect to any particular task. In some applications, it may even be advantageous to maintain multiple separate but equivalent representations simultaneously.

The baseline model is actually a commonly used way of presenting quantitative visual field information for human consumption: as a set of isopter lines drawn over the available potential visual field. Each line corresponds to a contour of constant performance, quantified in terms of sensitivity to light. For the simplest use cases, only a single contour is needed to demarcate the boundary between acceptable and unserviceable visual field regions.

This representation is particularly convenient (for the purposes of this document) since the techniques explained below yield direct samples of more-or-less arbitrary contour isolines. For cases where these contours are themselves the end goal, this removes the need for additional computation; reduced processing effort improves accuracy by avoiding new numerical artifacts. In contrast, HVFA contours must be extracted through numerical interpolation across multiple dimensions of collected measurements. Using GFA, contours are indirectly sampled by taking measurements that locate specific isopter thresholds at a limited set of angles, so further interpolation remains necessary.

Model Granularity

Below, modeled contours are depicted as continuous simple closed curves whether they are perfectly circular or highly irregular and asymmetric. Mathematically, the circle is fully characterized given only its center and radius. On the opposite side of the spectrum, an arbitrary closed planar curve can engender an arbitrarily complex parameterization—an infinite amount of data would be required for a completely faithful representation.

In practice, all contours are internally represented only at a finite number of points. It is universally assumed in this document that a sufficiently large number of suitably distributed points comprise all internal representations at all times, guaranteeing that rendered contours always appear satisfactorily smooth without manifesting aesthetically unpleasant discontinuities or other spurious features while the model is interactively adjusted.

Model Universality

For the purpose of simplifying the presentation, a single continuous (but not necessarily convex) central defect in the visual field is assumed. This does not reflect any limitation of the techniques described below, or of the representational capability of the model.

Whenever the assumption does not hold true, straightforward modifications to the methodology must be adopted. Where multiple disconnected defect regions exist, they can be processed individually with the resulting sub-models explicitly combined afterwards or simply left distinct. Non-central defect regions are accommodated by simply moving the fixation reference point.

Display

The display device is assumed to be a pair of AR or VR glasses worn by the subject. However, the technique is amenable to other display types as long as fixation can be achieved. For example, with chin and forehead support provided to the user, a standard computer monitor can be employed. Provided that the lighting environment is sufficiently controlled, this alternate display device can achieve performance levels comparable to the glasses.

Active vs. Inactive Eye

At any given time, at most one eye—the "active eye"—undergoes visual field characterization. To maintain experimental control and eliminate clutter and ambiguity in the subject's response, the view presented to the remaining inactive eye is blanked when using AR/VR glasses. When using a separate external display device, the inactive eye is covered.

Strictly speaking, isolated single-eye displays are only necessary around the moments when a threshold sensitivity is being probed with a calibrated light stimulus, or when the user is critically evaluating gestalt model suitability. Depending on the subject's vision, it may be more convenient or more comfortable to restore identical images to both eyes at intermediate times when delicate measurements are not being made.

Aspects of user interface mechanics and human factors engineering related to alternating between these modalities need further exploration. It is unknown, for example, whether a switch between display modes will produce disorientation, or if the transitions should be automatic or manually controlled.

Fixation

In all established visual field measurement methodologies, meaningful results are only obtained when the subject's gaze is fixed on a reference point.

Note that the fixation reference point is not necessarily central, although in most cases it will be. When necessary or advantageous, fixation references can be placed at or near the centroid of a noncentral visual field defect in order to map its boundaries or contours.

Controls

The user interface deliberately minimizes complexity by presenting the user with a modal interface having a limited degree of freedom in each mode—typically the available choices are to vary one parameter, accept the current value of that parameter, or cancel and return to the previous mode. Visual cues intuitively and unambiguously indicate the mode and available choices.

This simple setup can be effected using a few keys on a keyboard, but this requires a certain amount of dexterity and is undoubtedly fatiguing after long intervals. Except to an experienced touch typist, keyboards do not naturally encourage re-registration of the user's fingers on the controls at the proper location—particularly when the keys are not visible due to the artificially-projected GUI display in the AR/VR glasses.

An intuitive and natural scheme uses a custom handheld controller sporting a few buttons and a single continuously-variable sliding or rotating control having two clearly distinguishable directions: up vs. down, or clockwise vs. counterclockwise. Having only a few obvious and familiar adjustable affordances, the controller will be easy for nearly anyone to locate, orient, register, and operate without visual reference or detailed instructions. Something reminiscent of the original Atari 2600 paddle controller, with two buttons and/or a footswitch, would satisfy these criteria.

In the discussion below, the controller can be selected from any of the types described above. Without regard to its actual form, the text only assumes that there are at least four actions provided by this controller:

Accept—a button used to indicate successful completion of the current pending action, accompanied by user satisfaction with the current incremental state of the model (as evaluated by the user when viewing the display) and trigger movement to another mode;

Cancel—a button used to abandon currently pending changes to the incremental state of the model (which have been accumulating since entering the current mode) and trigger movement to another mode (typically, but not necessarily, the previous mode);

Increase—a button (or equivalent event generated by sliding a knob or rotating a dial) that adjusts a model parameter (with visual feedback for the user) in a single intuitive direction—the increment may be constant (for a button), can depend on current and previous state (slider or knob), or may be related to the force and/or velocity of the user's manipulation;

Decrease—same as Increase, with the change being in the intuitively opposite direction.

Additional control affordances in convenient locations may be desired for invoking ancillary functions that are not part of the modeling flow per se, such as toggling the visibility of the fixation reference fiducial. It is assumed that a keyboard always remains available as fallback inter-face for such actions.

Assessment

By providing UI infrastructure that allows the user to grade and gradually improve the subjective experience, this method guarantees that an optimal solution (within the limits of the experimental framework) can ultimately be reached.

Prior to an in-depth examination of UI mechanics in an upcoming section, the current section demonstrates how this seemingly objective goal can be achieved while relying entirely upon an incremental sequence of purely subjective user observations and decisions. Those decisions drive the subject's manipulation of UI elements in response to internal mental processes that cannot be directly captured or measured. Visual feedback coupled to the UI adjustments drives continuous forward progress, encourages renewed assessment of performance, and grants external visibility.

For some applications, the process enumerated below can be nearly exact; for others, there will be inevitable complications that must be addressed to achieve success.

Figure 6:
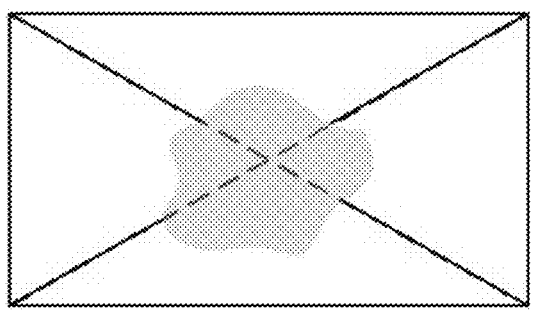
FIG. 6 is a notional empty user interface with visual defect obscuring fixation reference.

Consider first the notional version of a basic user interface depicted in FIG. 6. The rectangular boundary represents the full extent that the rectangular display device presents to the active eye. Lines implement the fixation reference pattern that is superimposed on the otherwise blank display. Gray shading indicates the desired visual defect contour to be mapped—this is, of course, not actually drawn or visible, but its presence is noticeable to the subject where it obscures or at least disturbs perception of the fiducial reference pattern.

Accuracy

Absolute accuracy requires absolute calibration of equipment. However, absolute accuracy is not an important goal. Even so, comparing results to detailed quantitative measurements from other special-purpose instruments is desirable for many reasons, and may provide a viable absolute calibration reference.

Relative accuracy, precision, and repeatability are expected to be excellent. The convenience of incremental model adjustment and instant model validation via subjective assessment is responsible for this. These seemingly less accurate models are sufficient to satisfy most users, and lead to more robust and maintainable implementations.

For some applications or purposes, however, the sensitivity threshold is an incomplete metric for assessing visual field quality. When the goal is to find the boundary between subjectively "good" and "bad" visual field regions, distortion may need to be considered as well. Obviously, the degree to which this is true may vary greatly across subjects.

The detailed UI notes presented below include a recipe for incorporating distortion by helping the user locate the boundary where both sensitivity and a subjective visual clarity criterion are satisfied.

Pacing

An important aspect of the visual field characterization method is its arbitrary time scale. The user is free to perform the steps at an individually preferred pace, potentially pausing and continuing—or restarting and repeating—at any time. Creating or updating a model can be spread across multiple sessions. Individual measurements or points within the model representation can be adjusted, revisited and readjusted repeatedly, and the granularity of the model can be increased when desired. These operations are permissible as long as the underlying visual field being measured remains stationary over the relevant time span.

Flexible pacing is possible because the tasks of modifying each point on the model boundary, assessing the quality of an individual adjustment, and assessing the overall model can be decoupled. As long as the subject can positively re-establish fixation, a "checkpoint" can be created or restored at any time (subject to the stationarity constraint). The model embodies "live" data that actively interacts with the subject, who becomes their primary interpreter. This contrasts heavily with the static measurements conventionally collected and passively analyzed by a physician using (e.g.) HVFA.

User Interface

When the subject interacts with the visual field characterization interface, the software provides high-level guidance by operating in one of a small number of mutually-exclusive modes. The current mode limits the actions and manipulations available to the subject, who knows the mode based on visual cues visible on the display. Within the limits of the mode, the subject makes inter-active adjustments to the display contents (which are in turn intimately coupled to the measurement/characterization process) before explicitly triggering a change to either the previous or next available mode.

There are four primary modes (0 through 3) defined for visual field characterization, each readily identified by a different visible UI appearance matched to its functionality and purpose. Additional modes with idiosyncratic UI features may also exist, but will be associated with initialization or finalization of the modeling process, and are not part of the modeling flow itself; these ancillary modes and displays will not be mentioned further.

The user begins with mode 0 but operates there only briefly, remaining only as long as it takes to establish a crude baseline working model. After that, the subject cycles among modes 0, 1 and 2 while incrementally updating the model. When the model is satisfactory, the user exits from these primary modes having produced a single visual field contour; additional contours can be created by repeating the entire process with different reference intensity levels or with a different defect.

Note that in all modes, the display of the fixation reference can be adjusted in intensity or toggled off & on under user control. The fiducial is always available for re-establishing or verifying fixation, but can be hidden to avoid interfering with calibrated stimulus levels.

Mode 0: Initial Working Boundary

In this mode, the user establishes a simple smooth closed curve to represent an initial crude model. The exact radius and coverages selected are not critical; neither is the intensity of the displayed circle—in fact it should be relatively bright and easy to see. When satisfactory, the user invokes the Accept control. Future steps will then refine this model.

Useful variations are possible. Though they remain simple, their use does require more explanation or training for the user due to a more complex user interface. One example is allowing the center of the circle to be moved so that it is no longer co-located with the fixation reference but more accurately captures the extent of a highly asymmetric contour. Another is supporting an oval-shaped boundary that exposes both aspect ratio and orientation as degrees of freedom (in addition to the centroid).

Mode 1: Boundary Review

In mode 1, the user can review the model as a whole in order to assess its performance and decide where adjustments, if any, must be made. This mode is a neutral resting state reachable directly from all other primary modes. No adjustments to the model can be made here; available controls are Accept (to signal that the model is complete and exit the characterization process), or Cancel (to indicate that the model is not complete, and request further adjustments in mode 2).

The displayed UI looks just like mode 0, but draws the current working boundary (initially inherited from mode 0 but potentially changed by actions taken in mode 2) using a calibrated color and intensity appropriate for the task.

Mode 2: Angle Selection

In this mode, the user only chooses a point on the boundary of the model. No changes occur to the model during mode 2.

Since the current working boundary is a simple closed curve, this is easily achieved by allowing the user to specify a direction, or angle. The UI displays a highly visible line segment extending from the center of the model (typically but not necessarily also the fixation reference point) along the selected angle until it intersects the display edge—some portion of line will be visible even in the presence of a large central visual defect.

While in mode 2, the Increase and Decrease controls interactively adjust the angle, with natural wraparound behavior. Cancel returns to mode 1, while Accept proceeds to mode 3 to allow the model to be adjusted at the point on its boundary corresponding to the selected angle.

Mode 3: Radius Adjustment

In this mode, the user adjust the working boundary by moving it radially inward and outward along the line corresponding to the angle most recently selected in mode 2.

During mode 3, the working boundary is hidden, and the UI only depicts movement of a small dot or cursor drawn using the calibrated color and intensity. A small cursor possessing articulated details, such as the + symbol, is useful for extending the task from simple threshold detection to incorporate a requirement of visual clarity. Toggling visibility for the fixation pattern and current model are supported (via TBD controls), but ultimately a judgement regarding the subjective best boundary position must be made using only a calibrated stimulus.

The user moves the cursor toward the center using Decrease, or outward using Increase, until it is as close to the center as possible while remaining clearly visible. Acceptance of the change is signaled with Accept, or rejection with Cancel; in either cases, a return is made to mode 2.

Other Use Cases

In addition to the UI flow described above for creating models, the software method supports the following use cases (not necessarily for consumption by end-users):

Bootstrapping the model (in mode 0) by importing measurements from HVFA, GFA, or other formats and methodologies. The user or operator chooses contours to extract from the foreign data, and can accept them without change (mode 1) or update them freely (iterating among modes 1, 2, and 3)—once a contour is derived from the imported model, it becomes indistinguishable from a natively-created model.

Updating a model, equivalent to bootstrapping from a pre-existing model.

Compare models by overlaying one or more static contours with the current working model (in mode 1) for the purpose of analyzing or tracking differences/changes.

Fiducial Fixation References for FOV Measurement and Defect Characterization

A recurring problem in all applications of FOV measurement, exemplified by the ubiquitous Humphrey Visual Field Analyzer (HVFA), is ensuring fixation. Consistent and meaningful results are only obtained while the subject's gaze is directed at a central point target, typically a yellow light in the case of the HVFA. When central field defects are present, the subject is unable to perceive this central point directly. In that case, the Zeiss HVFA provides two diamond-shaped fixation targets (one smaller, one larger) each consisting of four yellow lights for the subject to use for orientation. Others use corner-based references to address the issue of visual field defects precluding detection of the central target.

Providing a reference is only the first step. There is no way to guarantee fixation as long as the subject is able to shift focus, whether voluntarily, reflexively, or negligently due to drifting attention. This is a particularly vexing problem for HVFA, where the test methodology calls for continuous fixation throughout a single protracted session potentially lasting 20 minutes or more. HVFA estimates gaze direction with a single camera, very loosely coupling this monitoring to the test outcome by providing a single overall "fixation loss" count.

Present methods aim to produce detailed quantitative mappings of visual field defects; accurate sensitivity contours can be extracted from the raw data, potentially granting tremendous medical insight. Consequently, both also require careful consideration of stimulus presented to the subject since absolute sensitivity measurements are being made. Stray light must be avoided, and the contribution of any fixation references presumably must also be considered.

For this visual aid to work it does not necessarily need to obtain a fine-grained numerical representation of a subject's visual field. For many (if not most) applications, it remains sufficient to grade the total available FOV provided by the display device into two disjoint sets based solely on their capacity (or inability) to support "acceptably good" vision. Specific criteria for this delineation are necessarily subjective, and clearly must vary according to individual preferences and tolerances, but it is indisputable that the test subject is by definition a reliable arbiter for this distinction. Fixation thus becomes user-directed and user-confirmed.

Embracing this as a general principal exposes many simplifying opportunities as it grants the advantage of letting the subject set the pace for the experiment, measurement, or task at hand—effectively obviating the possibility of undetected fatigue. In this case, it also avoids the difficult constraint of preventing the fixation reference from interfering with a delicate quantitative measurement.

The chosen approach to providing the reference is simple. The following description assumes that the user is wearing AR or VR glasses, but it noted must later below that this is hardly an absolute requirement.

Instead of superimposing one or more discrete, unobtrusive fiducial devices onto the display, this method simply presents a single large and eminently noticeable fiducial pattern by drawing it across the entire rectangular display surface, layered above the normal display contents.

A family of patterns can be described that naturally suggest a designated (but typically central) reference point even if that reference is not directly perceptible to the subject due to visual field impairment or other restriction (including obscuration due to deliberate processing related to the current task at hand). The simplest pattern, intuitively graspable and hence most commonly used, is a simple cross: two lines, each connecting opposite corners of the entire rectangular display. This is depicted in FIG. 6, where a rectangular border represents the available display surface, lines indicate the drawn fiducial, gray shading highlights a visual field defect wherein the subject cannot perceive any details, and dashed lines hint at the unseen but extrapolated convergence point.

Figure 7A:
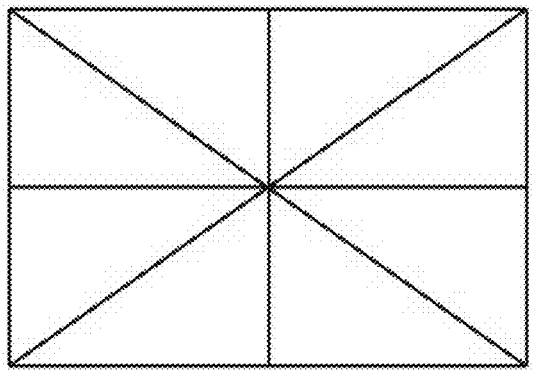
FIG. 7A shows one example of symmetric fiducials.
Figure 7B:
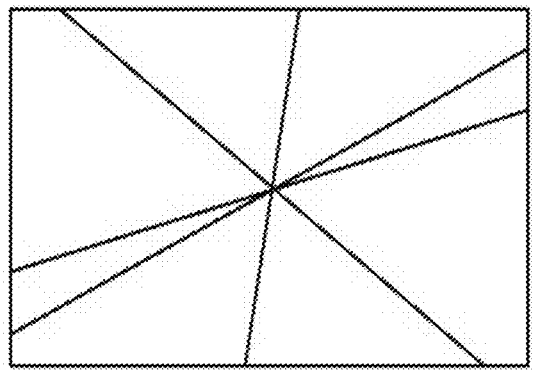
FIG. 7B shows one example of asymmetric fiducials.

As long as peripheral vision is available in at least three of the four corners, the user will be able to achieve fixation by using residual visual cues to mentally extrapolate the central intersection point. In problematic cases, additional lines crossing the display can be added to assist the subject in this visualization process. FIG. 7A shows one example of symmetric fiducials and FIG. 7B shows one example of asymmetric fiducials. Although symmetry is not required, retaining it may dramatically reduce the mental effort required for success; the most useful lines used in the fiducial pattern will be some subset of the ones shown below in FIG. 7A—those that connect opposite corners and midpoints of opposite sides. In FIG. 7B, asymmetric lines that meet at a central fixation point demonstrates a notional situation where large areas of the display surface are required to remain undisturbed (e.g., by fiducials).

Fiducial lines are drawn using a selected color, stroke pattern (e.g., dashes) thickness, and intensity appropriate to the goals of the task at hand and compatible the underlying image being displayed. Reference marks must be visible without causing distraction. Thus, the characteristics of the lines may adapt as the test stimulus or background image changes and can also vary locally in order to maintain visibility. In some situations it may be advantageous to animate various characteristics of the fiducial (e.g., as in Adobe Photoshop "crawling dots")—perhaps only temporarily—as long as this does not distract attention from the subject's primary task.

The display of fiducials described above can be completely independent of most tasks, a decoupling that allows them to remain active even during image processing adjustments that alter the effective visual field while real-time camera images are being displayed. As the displayed background images are warped or distorted, the fiducial appears undistorted and unchanging—or can be systematically but independently adjusted, e.g., to compensate for known visual field distortion patterns. Alternately, fiducials can be configured to disappear and rematerialize under interactive control, such as upon request whenever the user feels a need to reconfirm fixation. Hence, this flexible scheme is amenable not only to FOV characterization and defect mapping, but also for use under other calibration and operational regimes.

Finally, this style of fixation reference can be exercised in environments without AR or VR glasses. With a forehead and chin support, for example, it can be used with a fixed tablet, laptop, or monitor screen.

Mapping Functions

Mapping functions transform a source FOV (e.g., as captured by a camera) to a destination FOV (e.g., as presented on a display). This transformation can potentially move visual information from an arbitrary position in the source to an arbitrary location (or locations) in the destination.

Warping Functions

A warping function is a mapping function that performs any kind of coordinate transformation, including just linear scaling or shift operations. For simplicity and generality, this document will use the terms "warping function" and "mapping function" interchangeably, even where m is the identity function and the two domains are the same.

Polar Warping Functions

A polar warping function is a warping function parameterized using a radius r and angle $\theta$ (with respect to a well-defined origin, typically the center of an FOV) instead of Cartesian coordinates x and y. Equivalent polar and Cartesian representations both exist for any valid mapping—the polar parameterization is used strictly when the mapping is more conveniently presented within its framework.

Complex Radial Warps

In a complex radial warp function, the mapping from source to destination coordinates depends on the angle as well as the radius. They are not arbitrary two-dimensional mappings, however. At any given angle, the warping function remains only a function of the radius—visual information does not change angle under radial mappings. This approach mirrors the basic radial symmetry of the eye, but allows the details of the warping function to be adapted to the idiosyncrasies of the individual—to follow the contours of the visual defect, for example, or to take advantage of existing asymmetry.

Although this method lends the full expressive functional power of the simple radial warp to each angle, it simultaneously requires parameterization at every angle as well. A compromise would involve defining these one-dimensional warp parameters at a finite number of angles (not necessarily evenly spaced), then using interpolation at intermediate angles. Alternately, a high-level parameterization could be developed.

Practically speaking, it would be difficult and tedious to have a user calibrate independent parameters at different angles. Without constraining the relationship between parameters of nearby angles, the global impact of local changes cannot readily be anticipated. Experimentation is likely to give way to floundering unless constraints are enforced that result in controlled asymmetry, with tilted oval patterns replacing the perfect circular symmetry of the simple radial warps.

Polar Grid Warps

An alternative to the complex radial warps described above enables arbitrary polar mappings while still supporting intuitive manipulation and subjective optimization by the user.

Here, a polar grid is superimposed upon the source FOV, with its image under the current warping function (if any) also visibly drawn upon the destination FOV. Grid spacing in both the radius and angle axes can be arbitrarily specified, and grid resolution can even be changed while the warp function is being interactively defined without disturbing the existing warp in an unexpected way.

The user manipulates individual visible grid points via methods described below. The perturbed grid defines the mapping from source to destination coordinates, with interpolation being used at intermediate points. Changes are immediately reflected in the destination display. Although the effective number of parameters (the coordinates of the grid points) can be relatively large, feedback in the form of the visible grid and mapped source image supports intuitive subjective adjustment. This may sound counterintuitive at first. The simpler radial warps have a small number of parameters, but each adjustment affects the displayed image in a global manner; the grid warp has a larger number of adjustable controls, but the impact of any change is localized and limited.

Regularizing the grid by constraining nearby grid points—as if they are joined by rubber bands, moving slightly when connected to a node being manipulated by the user—also aids the user in arriving at an aesthetically pleasing solution. Further automated regularization, applied after all user adjustments are complete, can also help (subject to user approval).

A simple and potentially very effective strategy for customizing a polar warp to an individual user is to start with a simple radial warp, then imposing a relatively simple polar grid on top of that. The adjustable grid can be tuned to introduce any desired idiosyncratic asymmetries.

Cartesian Grid Warps

Most people are not adept at thinking in terms of polar coordinates. Grids formed with polar coordinates have non-intuitive aspects, such as the inherent non-uniformity of regions (where wedge shaped grid "squares" widen at larger radii, leading to non-uniform interpolation even with an undistorted grid), the mixture of curved and straight boundaries, and the wraparound of the angle axis. In spite of having a visible polar grid as a guide, users may still have difficulty adjusting warping functions with polar effects unless considerable symmetry is present or some of the complexity-reducing constraints described above are enforced. These restrictions limit the gamut of achievable corrections.

On the other hand, users are likely find working with Cartesian mappings reasonably intuitive.

Analogous to the polar grid described above, a regular Cartesian grid can be adopted. Once again, the grid spacing can be arbitrarily specified. Even an irregularly-spaced Cartesian grid is easy to interpret due to the uniformly straight boundary segments: in contrast to the polar grid, any stretching and compression induced by grid adjustment is much easier to predict, even without enforcing regularization.

A Cartesian grid need not cover the entire source FOV. Unlike the polar grid, which is difficult to use when not centered at the origin, it is straightforward to tailor a Cartesian grid to any rectangular subset of the source FOV. Thus, it can be used for local distortion correction (in composition with additional warp types) as well as global mapping—regions outside of its local domain can be left unmodified.

Figure 8:
FIG. 8 depicts a warped grid and the result of applying the associated mapping to an image.
Figure 9A:
FIGS. 9A-9D illustrate examples of iterative model refinement using a multi-resolution pyramid.
Figure 9B:
Figure 9C:
Figure 9D:

FIG. 8 depicts a warped grid and the result of applying the associated mapping to an image. If the inverse mapping that corresponds to this grid were derived, it could be used to reverse the distortion and recover the original image.

Grid Warp Representation

Grid warps are efficiently represented by parameters chosen only at positions lying on an underlying grid structure. The locations of the grid points correspond to coordinates in the source FOV. Despite the parameters existence only at a small set of specific points, the mapping function associated with the grid warp is well-defined over the entire input FOV.

Since both are two-dimensional, polar and Cartesian grids can be treated uniformly. Polar forms appear identical to their Cartesian counterparts once they are "unrolled," although there is an additional need to enforce a continuity constraint where the angle wraps around across the "cut." Except where explicitly mentioned, the discussion below applies to both forms.

The visual aid adopts uniformly spaced two dimensional B-spline representations for all grids, taking full advantage of their numerous theoretical and practical benefits. B-splines ("basic" splines) permit a simple parameterized closed-form representation of the two-dimensional warp function. The parameters (called "knots") are the grid coordinates, so the primary data associated with a single two-dimensional mapping is a pair two-dimensional arrays specifying the mapped values evaluated at the regular grid points of the input domain; spline interpolation provides values at all intermediate points. Uniform knot spacing is sufficient, with no need to support the more complicated implementations that come with non-uniformly spaced splines since modern GPU hardware imposes essentially no penalty when increasing grid density to levels matching the dimensions of the source or destination images.

With B-splines, the order of the spline representation becomes an additional model parameter than can be chosen or adjusted independently of the knots. Furthermore we can change the model order whenever advantageous, and also gives the user the option of choosing spline order for the final output display.

Regardless of the order, the closed-form nature of the B-spline representation renders it amenable to mathematical analysis and optimization; there are, of course, trade-offs between computational complexity and beneficial analytical properties. First-order splines correspond to linear interpolation, which is most intuitive but somewhat prone to perceptible artifacts that expose the underlying grid points and lines connecting them. Higher orders cause multiple adjacent grid points to influence the interpolation, leading to smoother distortions (but in a fundamentally different way from the previously-described "rubber band" regularization which would directly constrain knot locations themselves). There is generally no reason to exceed third order in any application, and in fact this is the lowest order that guarantees the existence of continuous derivatives in the warp function—particularly useful for quickly and accurately deriving inverse warp functions.

Grid Manipulation Interface

Grid manipulation—changing the parameters of the grid warp—is used to correct local distortion, to mark boundaries or map contours of visual field defects, and to move visual information from one location to another with a visual field. Regardless of the purpose, a common framework and mechanic applies when the adjustments are interactive.

This section describes numerous aspects related to user-driven interactive grid manipulation, including physical controls and GUI, visual feedback, human factors, and salient implementation details for the end-to-end process. It begins with an overview that provides sufficient background to connect the detailed subsections that follow. A detailed flowchart is also given later.

First, however, note that reference is made to a number of different grids. To avoid confusion, the following terminology is used:

Mapping grid—refers to the visual field model ("grid warp") being adjusted, i.e., the parameterized mapping function which controls how regularly-spaced points from the input FOV or image are transformed into new locations in the output/display FOV or image;

Reference grid—refers to an undistorted grid that is presented to the user on the AR display but only perceived after both FOV processing (typically including the effects of the map-ping grid) and the user's own physiological visual field defects have been applied;

Perceived grid—refers to the user's mental picture of the displayed reference grid.

In particular, note that the mapping grid is the only one containing model data (parameters) used for image processing, and its representation, size, and resolution are independent of the other grids.

Grid Manipulation Overview

Whether the mapping being adjusted has underlying polar or Cartesian form, basic operation is the same. A user wearing the visual aid display device views a calibration pattern. Without any processing, this calibration pattern will appear distorted if it overlaps a visual field defect. Even after customized FOV processing, the view might still have residual uncorrected errors or show mapping artifacts deliberately introduced to improve FOV at the cost of distortion. Of course, during the adjustment process itself, the appearance and amount of distortion will vary. The goal of grid manipulation is to drive the appearance and distortion toward an optimal—or at least acceptable—condition in a systematic fashion.

In distortion correction tasks, the user manipulates the mapping grid with the goal of reducing visible distortion. Generally, the selected calibration pattern will have easily-discerned components with a regular and orderly structure to facilitate the detection and qualitative assessment of distortion. A uniform reference grid (polar or Cartesian) has such characteristics and therefore lies at the heart of most calibration patterns. Humans are highly sensitive even to slight non-uniformities (such as bending lines, non-square angles, irregular grid cells) in the resulting perceived grid.

Users do not have direct access to the mapping grid being manipulated—it is too opaque a structure for the mathematically naive—but can effortlessly evaluate the imperfections induced from the reference grid onto the perceived grid by the combination of mapping grid action and any physiological distortion. An interactive GUI allows the user to select a visible perceived grid point and move it around. As the user adjusts the location of this point, he also defines an incremental change in the current mapping that is immediately merged into the mapping grid. Results are visible even as they are being made.

It important to note here that both the reference grid and the resulting perceived grid exist only as a guide for the user; they are practical but not essential artifacts. The perceived grid and map-ping grid are only coupled together by the reference grid (which is, of course, unaffected by either signal processing or physiology) and the physiological visual perception processes of the user. They are effectively independent, with the perceived grid only existing inaccessibly within the mind of the user, but the combination of direct manipulation interface and instantaneous visual feedback allows the true underlying mapping function to be indirectly and gradually captured into the mapping grid.

Thus, there is actually no restriction for the user to select and manipulate points lying only on the perceived grid. Hence, the GUI permits the user to select any point visible on the display and move it, causing the underlying mapping grid to be updated appropriately.

Reference and perceived grids truly are only a visual aid for this process. Realistically, users will tend to choose to manipulate points lying on the grid that they can perceive, because the resulting effects will be intuitively predictable. To support accurate and disciplined mapping, a hierarchical approach is described below that takes leverage all of these characteristics.

For tasks not directly related to distortion correction, the grid manipulation process remains essentially unchanged. Instead of trying to reduce distortion, the user adjusts the display to suit the task at hand. In all cases, the user's subjective judgement drives the task.

Calibration Patterns

It has already been stated that a regular grid forms the basis for an excellent calibration pattern. Additional related concerns are discussed here.

First consider a vertical blank white wall, whiteboard, or computer display with a uniform grid pattern marked on it. The pattern is large enough to fill the FOV of a user standing squarely in front of it. A user having a visual field impairment, with no additional image processing, would perceive a distorted grid as determined by his idiosyncratic visual system. With the GUI and other features described above, the user can adjust the mapping until appearance of the perceived distorted grid has improved satisfactorily.

Using this type of physically-displayed grid presents some practical problems. Maintaining a fronto-parallel viewing aspect to avoid perspective distortion is not easy, and may become uncomfortable. The perceived grid will also change slightly with each body movement. Fortunately, this problem can be overcome by using the glasses to display a reference grid. This virtual reference grid has no physical manifestation, and is an ideal reference grid with the current mapping grid applied. To the user, it appears and behaves like the physical drawn grid but maintains a fixed position on the display device regardless of user motions.

There is also no need to limit the calibration pattern to just the lines of the reference grid. A virtual grid can be semi-transparently drawn atop the current camera image, allowing the user to make decisions based not only on the reference grid (which may have widely spaced features) but also on the appearance of fine details in the local environment. Additional virtual features, such as text, can also be added to the calibration pattern as long as they are also uniformly processed by the current mapping function. All features, real or virtual, can also be static or dynamically updated.

Finally, calibration patterns can be changed at any time in order to fine-tune the model, for example by shifting the grid, temporarily hiding it, increasing the reference grid density, or cycling through a set of background patterns to look for visible anomalies. A subsequent section, below, will describe a systematic approach to changing calibration patterns that facilitates obtaining a complete model.

GUI and Controls

The graphical user interface presented during grid manipulation is deliberately simple. The image displayed on the output device always has the current mapping function applied, and it is difficult to convey additional graphical information meaningfully when dynamic distortion with unknown characteristics can be present.

The primary image occupying the output display device is the normal camera output or an internally-generated calibration pattern. Superimposed upon that may be additional calibration patterns. The most common of these will be a virtual reference grid.

The only additional visual element needed is a simple cursor controlled by the user for selecting a point in the output FOV and shifting its position. A joystick, D-pad, Wii-mote, 3D-mouse (etc.), or keyboard moves the cursor around the display. Free movement vs. "grabbing" and dragging the display (as the warp model is updated) occurs depending on a mode controlled by a button or keyboard toggle. An additional modal control selection simplifies interaction by constraining the cursor location to existing reference grid points—this will be especially convenient if a keyboard—only interface is substituted for the joystick, and for users lacking fine motor skills.

An alternative interface that is particularly intuitive takes advantage of the augmented-reality aspects of the display device. Instead of manipulating a cursor indirectly with a joystick or key-board, AR finger tracking can be employed. The tip of a tracked finger represents the cursor, and free movement vs. dragging managed by a toggle control in the other hand. It may be convenient in this case to constrain the dragged point to the nearest reference grid location, otherwise the fin-ger will obscure the view. A minor inconvenience of this approach is that the distorted view of the user's hand may be disorienting.

Finally, interactive model-building and exploration is also aided by an "infinite undo" feature for backtracking, plus the ability to create "snapshots" or "bookmarks" of the current mapping at any time.

The hierarchical calibration described in the next section brings one additional detail to the GUI.

Hierarchical Calibration

A systematic hierarchical multi-resolution approach is used to avoid overwhelming the user with a large number of adjustable parameters and grid points. The mapping function is constructed as a multi-resolution pyramid, beginning with a low-resolution low-complexity model that is progressively refined.

Initially, the mapping grid has only four points delineating a single grid cell. The GUI displays the locations of these points in a way that distinguishes them from the reference grid and other dis-played items. The user adjusts only these four corner points for a very rough correction of the distortion—really no more than mapping the corners of the distorted source region (which might be the entire input FOV or merely a subset) to the correct neighborhood in the destination FOV. The accuracy of the initial placement is not critical, as the model can be updated later.

Next, the resolution of the mapping grid is increased, doubling the number of grid cells in each dimension. New internal grid points are computed automatically, in such a way that the overall mapping is not changed even though the number of parameters has increased. The user can then adjust any of the grid points—old or new—until satisfied that distortion is mitigated to the full extent possible with the current resolution. In places where the lower-resolution model is already sufficient, there is no need to modify any of the new grid points. Resolution is progressively increased until the result is satisfactory. At each stage, the task complexity is kept manageable by having either a small number of free parameters or a reasonable starting point.

A multi-resolution pyramid is illustrated conceptually in FIGS. 9A-9D. In these images (taken from a different application), the grid is gradually adapted to capture the mapping that was used to distort an image rather than the one that removes the distortion, but it is clear here that increased model resolution successfully captures more and more fine details while providing a viable bootstrapping technique. The red model grid points are connected by red lines which would not necessarily be displayed in the calibration procedure described above, but are helpful for visualizing what is happening in here. Also notice that the presence of straight lines aligned along the display axes (e.g., the vertical feature at the left of the image) directly reveal the structure of the underlying distortion—hence a superimposed (distorted) reference grid would greatly simplify the mapping task.

As a practical matter, models are given extra parameters represented by an extra row or column of grid points just outside of its nominal boundary. This "padding" is never modified by the user, but follows simple rules that constrain warping at edge of the nominal model region to remain well-behaved instead of exhibiting a singularity, and also supports smooth blending of the warped area into the larger output FOV when only a small subset of the FOV is being modeled.

Grid Manipulation Flowchart

Figure 10:
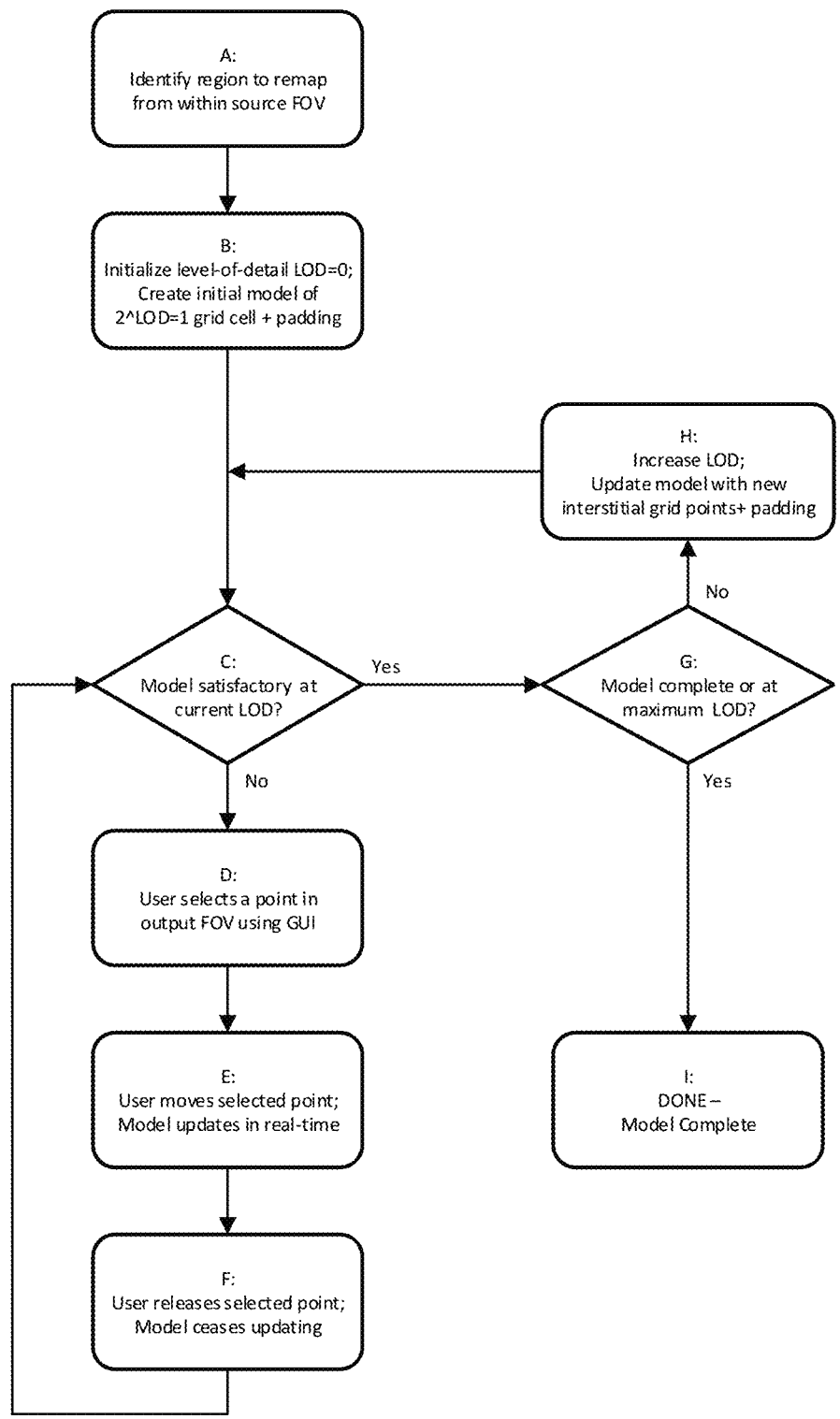
FIG. 10 is a grid manipulation flowchart, including hierarchical model construction.

The flowchart in FIG. 10 summarizes the processes described above, including the hierarchical model construction, at a high level. Throughout the duration of this process, the user can freely change the visible calibration pattern, adjusting it to match the specific area or level of detail being considered.

Summary

Key Ideas:

A continuous-space model for input (camera) and output (display) FOVs—in spite of the discrete pixel coordinates inevitably associated with their hardware—facilitates analysis.

Two-dimensional mapping functions warp images by transforming source to destination coordinates.

A class of radial mapping functions presented have simple parameterizations with limited number of degrees of freedom, lending themselves to intuitive adjustment by untrained users. Despite their simple form, they still provide powerful and universal transformation capabilities Grid-based mapping functions that have a larger number of parameters, but an intuitive structure with each parameter (grid point) having limited or localized influence on the out-put.

B-spline representation for grid-based mapping functions that supports efficient computation and also allows semi-analytical treatment of the models, e.g., for computing derivatives and performing optimizations.

Composability and scalability of warps, which can be designed and calibrated independently and then later applied in combinations to give intuitively predictable results. For example, a Cartesian distortion correction grid can be cascaded atop a simple radial warp to fine-tune the overall FOV.

Visual updates in real-time, with instant feedback driven by simple and intuitive controls, mean that a user does not need to understand the nature or mathematical qualities of the transformation he has needs to correct or improve his vision, but still ends up with a solution that he has implicitly optimized.

Ability to adjust and fine-tune models at any time, making updates whenever necessary or convenient.

An intuitive and easy-to-use user interface for manipulating grid-based maps, supplemented by a hierarchical multi-resolution model-building process that steadily guides the user toward incrementally better solutions. The logical progression from coarse-to-fine model resolution inherently prevents the user from feeling overwhelmed by the sheer number of choices offered by the grid model without limiting its representational capacity.

Augmented-reality finger-tracking interface for model adjustment: hand movements directly update the model and the real-time display, giving a user the appearance and experience of direct control over the visual field. This is subjectively very different from (e.g.) using a joystick to move a colored pixel that subsequently "drags" the display with it.

Selected point for "dragging" to change the model is not limited to reference grid points (which are always decoupled from the model) or even the current model grid points.

Calibration patterns that help guide the user-driven model optimization process can be presented virtually (e.g., in the form of virtual reference grids), visible only within the output display device and not requiring any external apparatus or support. The pattern can be changed or fine-tuned at any time during the model-building process, allowing it to be optimized for a specific area of the FOV or tailored to a specific level detail (model resolution).

Calibration patterns, especially calibration grids, are decoupled from the model Checkpoints/bookmarks and undo capabilities for interactive exploration.

Achievable accuracy (in capturing the nature of the true underlying distortion) limited by the user's ability to resolve differences in performance. If the user cannot tell the difference, then by definition that difference is insignificant.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

As one skilled in the art would recognize as necessary or best-suited for performance of the methods of the invention, a computer system or machines of the invention include one or more processors (e.g., a central processing unit (CPU) a graphics processing unit (GPU) or both), a main memory and a static memory, which communicate with each other via a bus.

A processor may be provided by one or more processors including, for example, one or more of a single core or multi-core processor (e.g., AMD Phenom II X2, Intel Core Duo, AMD Phenom II X4, Intel Core i5, Intel Core i& Extreme Edition 980X, or Intel Xeon E7-2820).

An I/O mechanism may include a video display unit (e.g., a liquid crystal display (LCD) or a cathode ray tube (CRT)), an alphanumeric input device (e.g., a keyboard), a cursor control device (e.g., a mouse), a disk drive unit, a signal generation device (e.g., a speaker), an accelerometer, a microphone, a cellular radio frequency antenna, and a network interface device (e.g., a network interface card (NIC), Wi-Fi card, cellular modem, data jack, Ethernet port, modem jack, HDMI port, mini-HDMI port, USB port), touchscreen (e.g., CRT, LCD, LED, AMOLED, Super AMOLED), pointing device, trackpad, light (e.g., LED), light/image projection device, or a combination thereof.

Memory according to the invention refers to a non-transitory memory which is provided by one or more tangible devices which preferably include one or more machine-readable medium on which is stored one or more sets of instructions (e.g., software) embodying any one or more of the methodologies or functions described herein. The software may also reside, completely or at least partially, within the main memory, processor, or both during execution thereof by a computer within system, the main memory and the processor also constituting machine-readable media. The software may further be transmitted or received over a network via the network interface device.

While the machine-readable medium can in an exemplary embodiment be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. Memory may be, for example, one or more of a hard disk drive, solid state drive (SSD), an optical disc, flash memory, zip disk, tape drive, "cloud" storage location, or a combination thereof. In certain embodiments, a device of the invention includes a tangible, non-transitory computer readable medium for memory. Exemplary devices for use as memory include semiconductor memory devices, (e.g., EPROM, EEPROM, solid state drive (SSD), and flash memory devices e.g., SD, micro SD, SDXC, SDIO, SDHC cards); magnetic disks, (e.g., internal hard disks or removable disks); and optical disks (e.g., CD and DVD disks).

Furthermore, numerous references have been made to patents and printed publications throughout this specification. Each of the above-cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

What is claimed is:

1. A method of presenting real-time video images to a user on a display, comprising the steps of:
   displaying the real-time video images and a calibration pattern on the display to the user;
   receiving an input from the user that manipulates a parameter of the calibration pattern;
   continuously processing the real-time video images based on the input to produce warped real-time video images;
   continuously displaying the warped real-time video images on the display to the user.

2. The method of claim 1, wherein the real-time images and the calibration pattern appear distorted to the user where they overlap with a visual field defect of the user.

3. The method of claim 2, wherein the warped real-time video images reduce an appearance and amount of distortion of the visual field defect to the user.

4. The method of claim 1, wherein the calibration pattern comprises a plurality of points delineating a single grid cell.

5. The method of claim 4, wherein the manipulated parameter comprises an adjusted position of at least one of the plurality of points.

6. The method of claim 4, further comprising modifying the calibration pattern to include a plurality of grid cells.

7. A method of calibrating real-time video images to correct for a visual field defect of a user, comprising the steps of:
viewing a calibration pattern and the real-time video images on a display;
manipulating the calibration pattern with an interactive user interface;
instantaneously viewing warped real-time video images based on the manipulated calibration pattern; and
repeating the manipulating the calibration pattern step and the instantaneously viewing warped real-time video images step to reduce the appearance of the visual field defect.

8. The method of claim 7, wherein the calibration pattern appears distorted to the user where it overlaps with the visual field defect.

9. The method of claim 8, wherein the warped real-time video images reduce an appearance and amount of distortion of the visual field defect to the user.

10. The method of claim 7, wherein the calibration pattern comprises a plurality of points delineating a single grid cell.

11. The method of claim 10, wherein manipulating the calibration pattern comprises changing a position of at least one of the plurality of points.

12. The method of claim 11, further comprising modifying the calibration pattern to include a plurality of grid cells.

13. A method of presenting real-time video images to a user on a display, comprising the steps of:
displaying a calibration grid and the real-time video images to the user on the display, the calibration grid having a first resolution;
receiving a first input from the user that manipulates a first parameter of the calibration grid;
processing the real-time video images based on the first input to produce warped real-time video images;
adjusting a resolution of the calibration grid to a second resolution;
displaying the calibration grid and the warped real-time video images on the display to the user, the calibration grid having the second resolution;
receiving a second input from the user that manipulates a second parameter of the mapping grid;
processing the real-time video images based on the second input to produce second warped real-time video images.

14. The method of claim 13, wherein the calibration grid appears distorted to the user where it overlaps with a visual field defect of the user.

15. The method of claim 13, wherein the display comprises a wearable display.

16. The method of claim 14, wherein the first and second warped real-time video images reduce an appearance and amount of distortion of the visual field defect to the user.

17. The method of claim 13, wherein the first resolution of the calibration grid comprises a plurality of points delineating a single grid cell.

18. The method of claim 17, wherein the manipulated first parameter comprises an adjusted position of at least one of the plurality of points.

19. The method of claim 17, wherein the second resolution of the calibration grid comprises a plurality of grid cells.

20. The method of claim 19, wherein an amount of the plurality of grid cells is selected from the group consisting of four grid cells, sixteen grid cells, and sixty-four grid cells.

* * * * *